Figure 1:
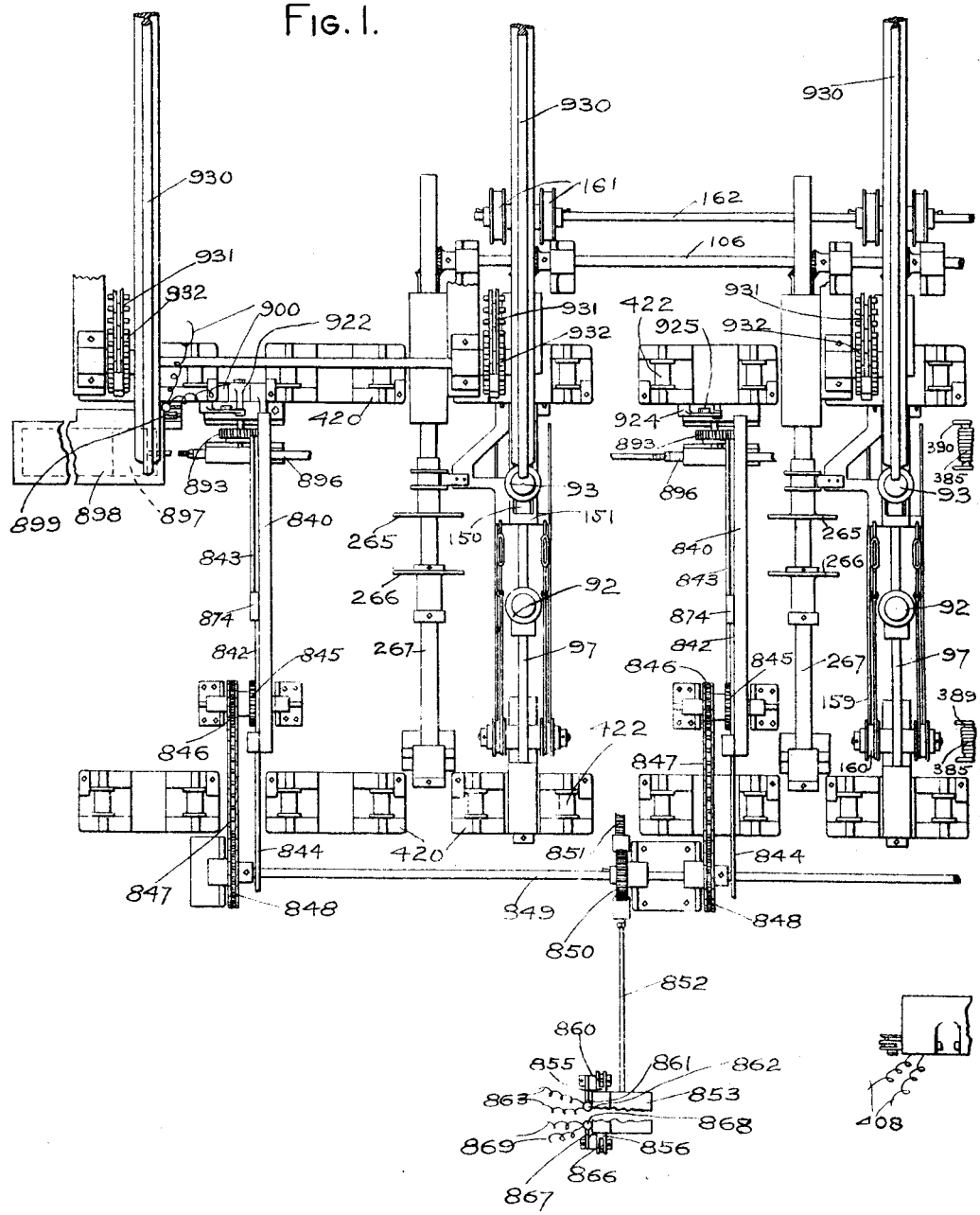

T. P. PAYNE.
METAL WORKING MACHINE.
APPLICATION FILED MAY 3, 1909.

1,075,491.

Patented Oct. 14, 1913.
16 SHEETS—SHEET 1.

WITNESSES:
A. L. Saltzman
R. Menk

INVENTOR:
T. P. Payne
By John D. Morgan
ATTORNEY.

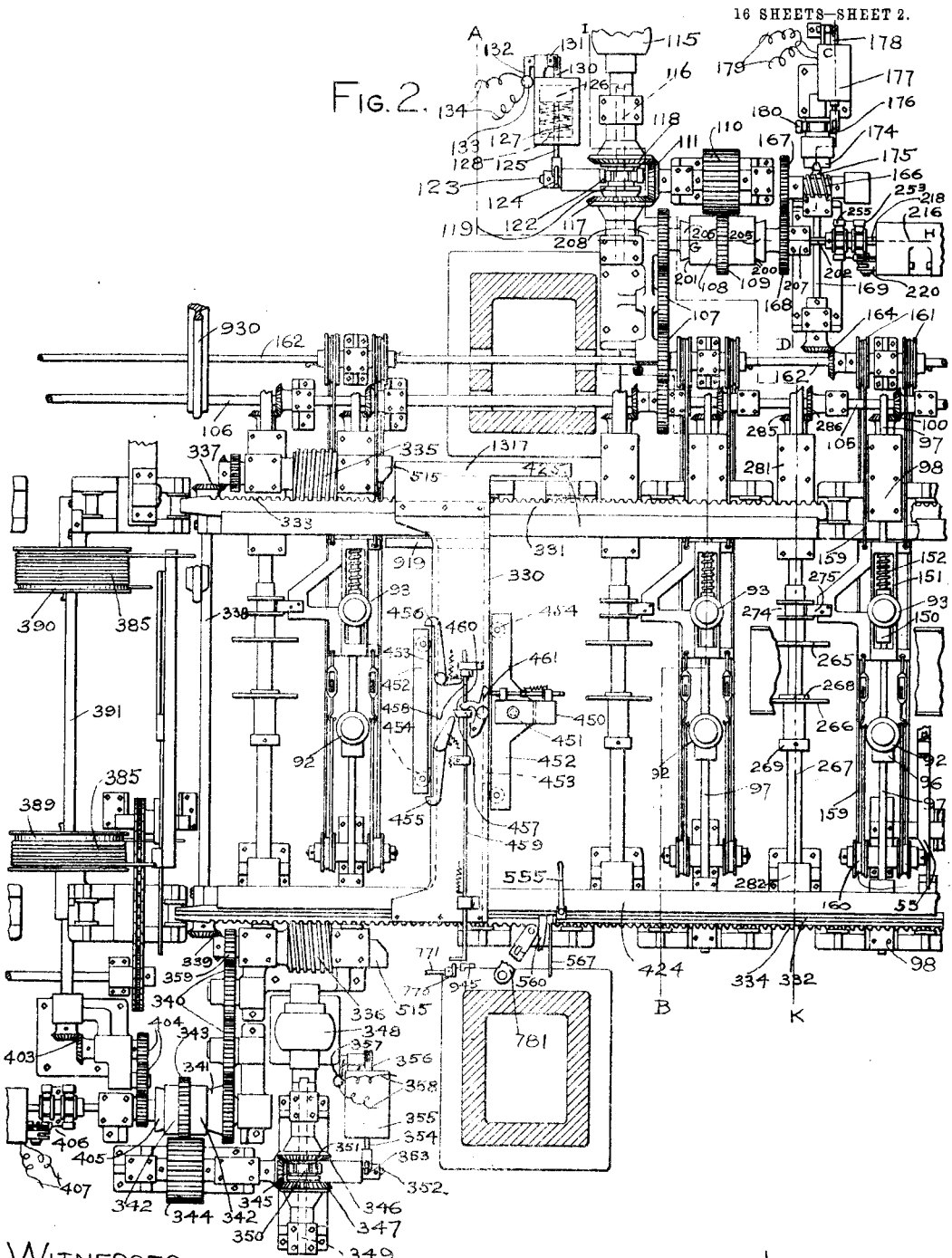

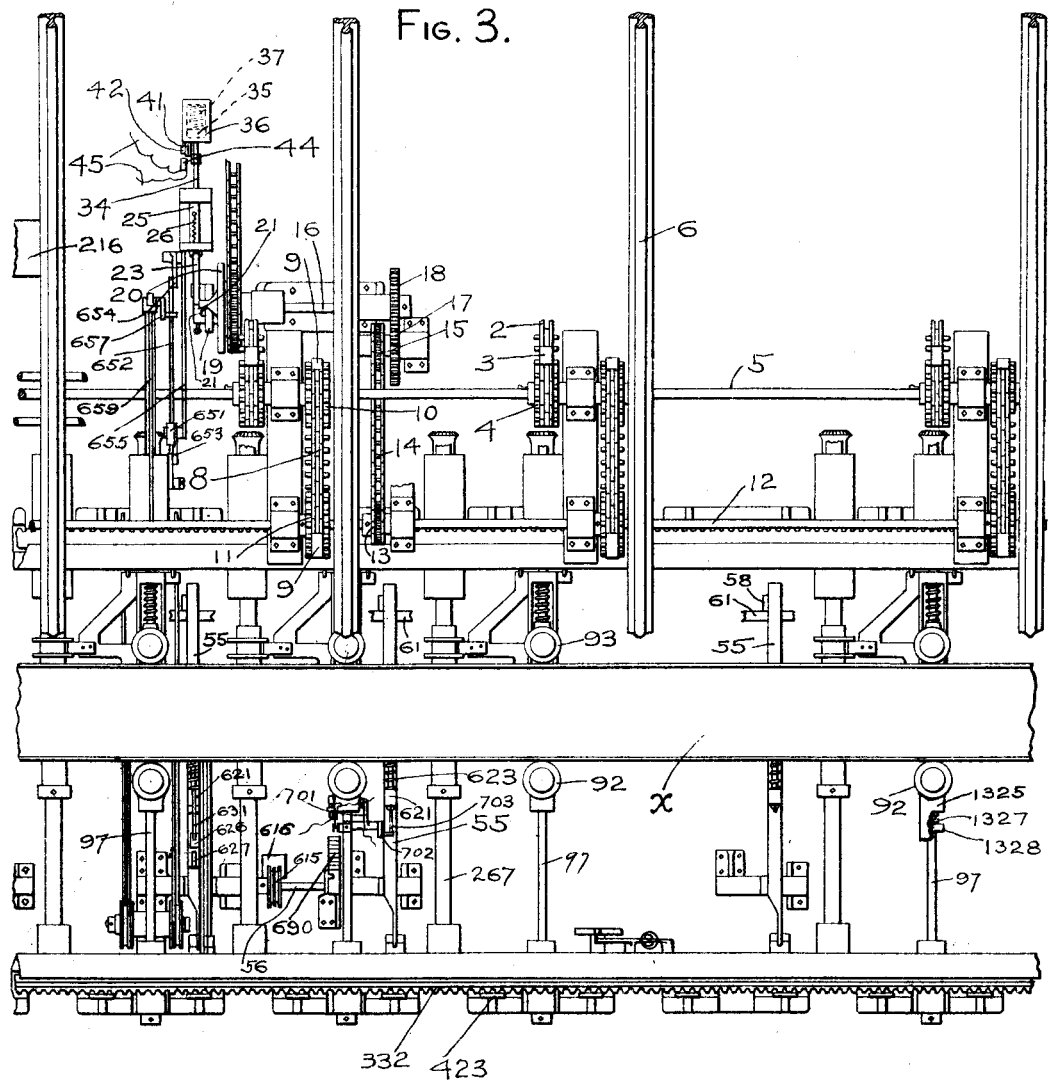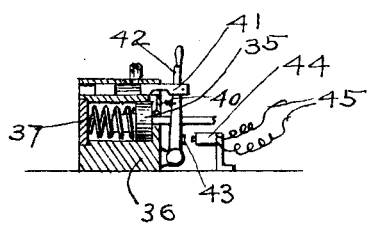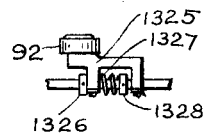

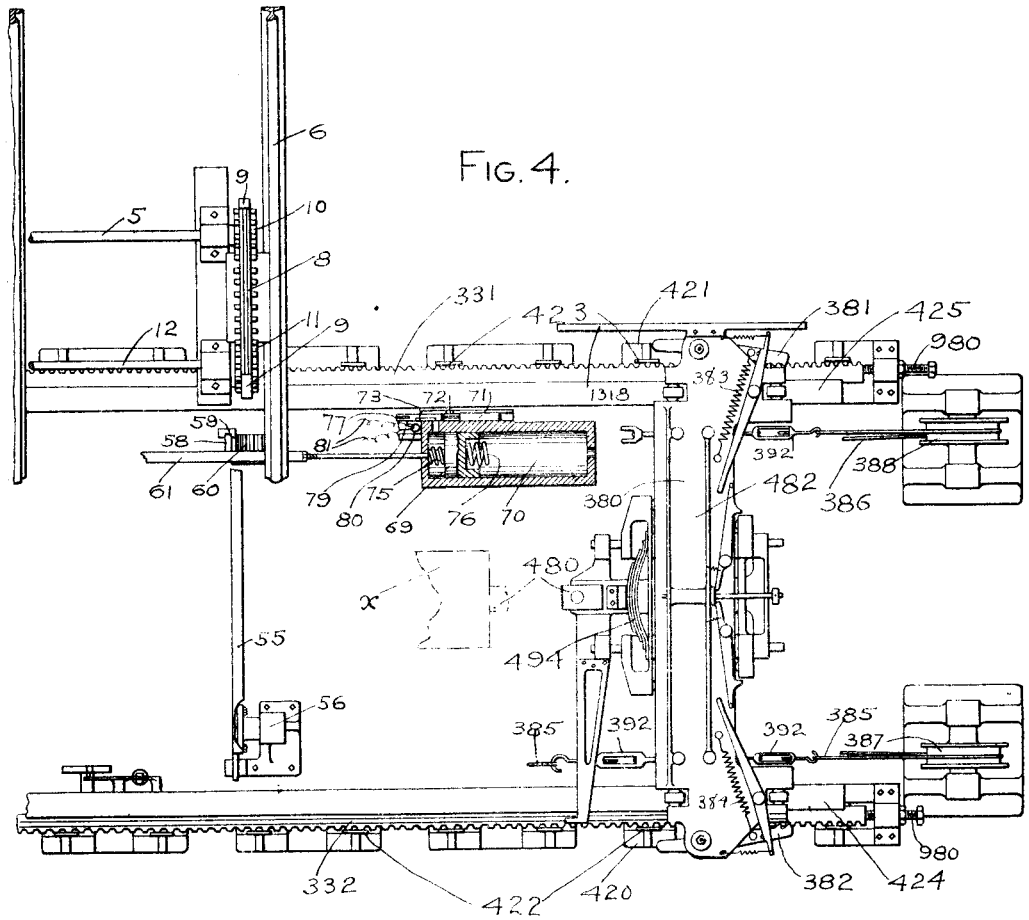
Fig. 4.
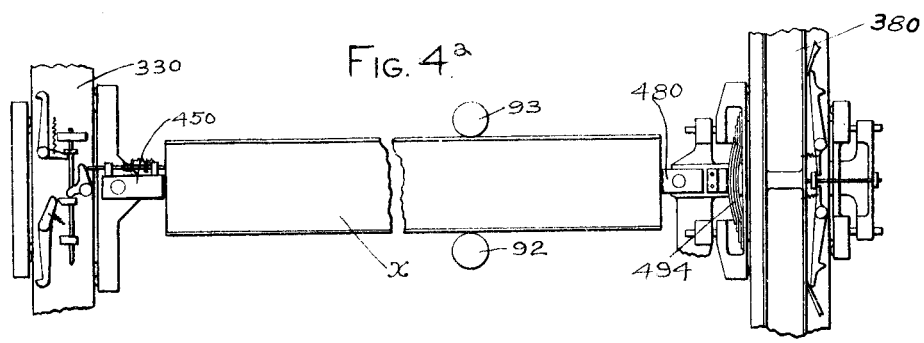
Fig. 4ª.

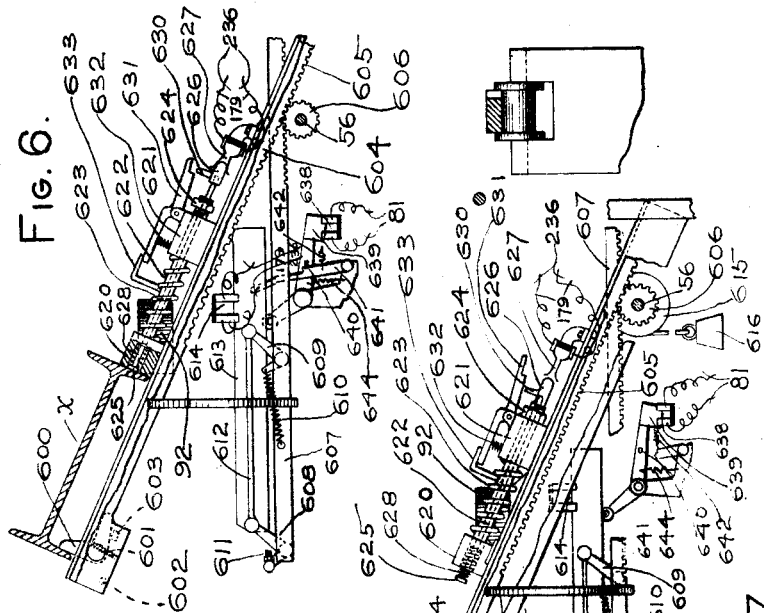

T. P. PAYNE.
METAL WORKING MACHINE.
APPLICATION FILED MAY 3, 1909.
1,075,491.
Patented Oct. 14, 1913.
16 SHEETS—SHEET 6.
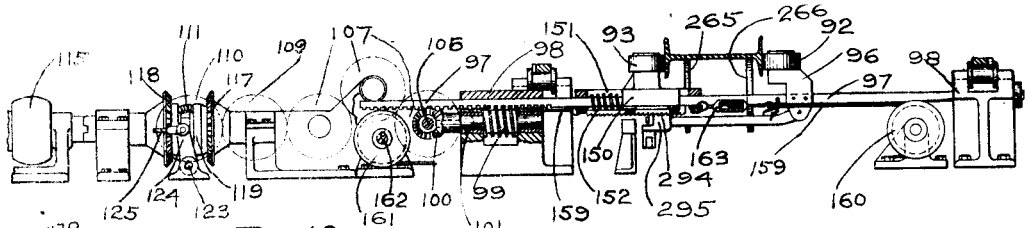
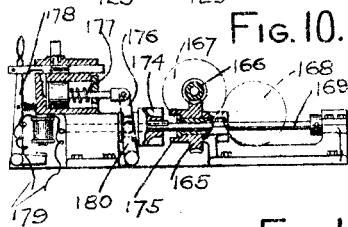
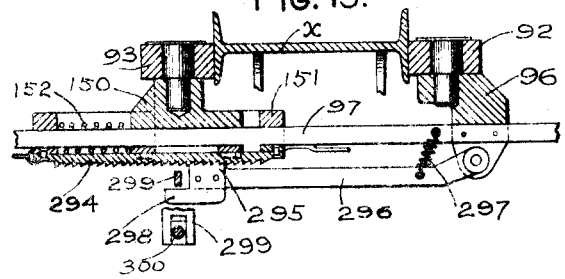
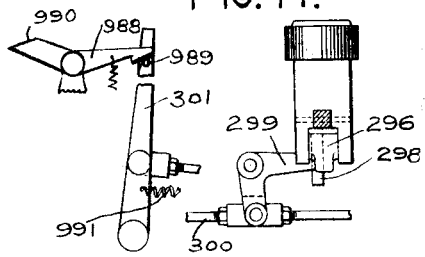
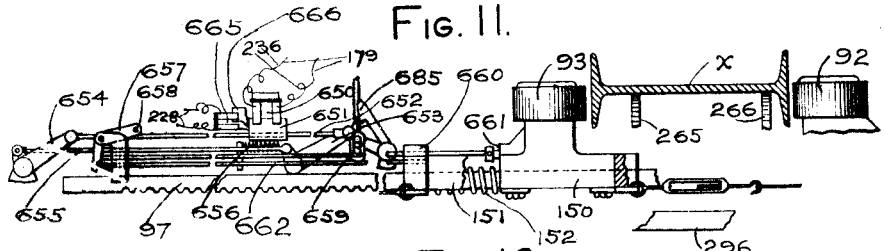
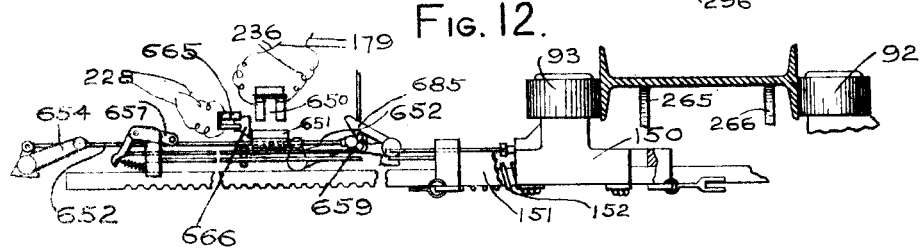
WITNESSES:
A. R. Saltzman.
R. Menk
INVENTOR:
T. P. Payne
By John D. Morgan
ATTORNEY T. P. PAYNE.
METAL WORKING MACHINE.
APPLICATION FILED MAY 3, 1909.
1,075,491.
Patented Oct. 14, 1913.
16 SHEETS—SHEET 7.
Fig. 15.
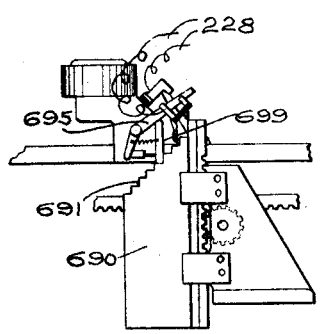
Fig. 16.
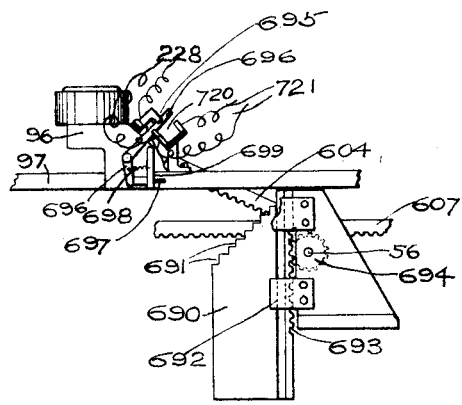
Fig. 17.
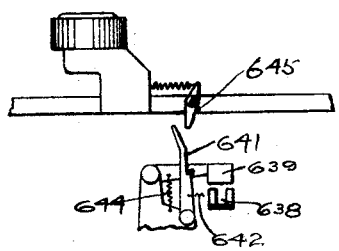
Fig. 16ª.
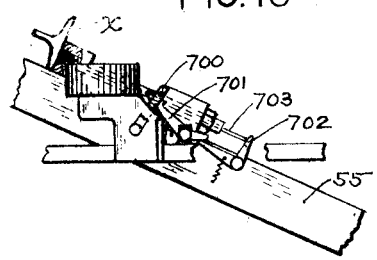
Fig. 34ª.
Fig. 34.
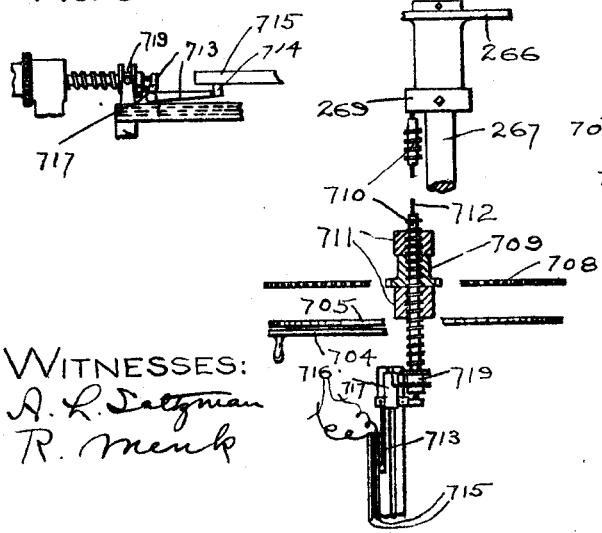
Fig. 35.
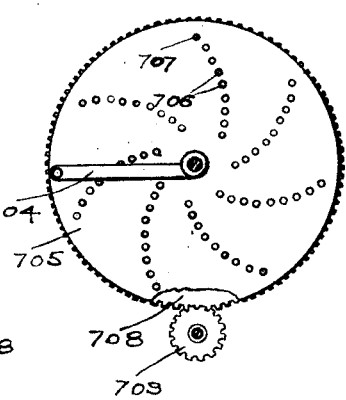
WITNESSES:
A. L. Saltzman
R. Menk
INVENTOR:
T. P. Payne
By John D. Morgan
ATTORNEY.

T. P. PAYNE.
METAL WORKING MACHINE.
APPLICATION FILED MAY 3, 1909.

1,075,491.

Patented Oct. 14, 1913.
16 SHEETS—SHEET 8.

WITNESSES:
A. L. Saltzman
R. Menk

INVENTOR:
T. P. Payne
By John D. Morgan
ATTORNEY

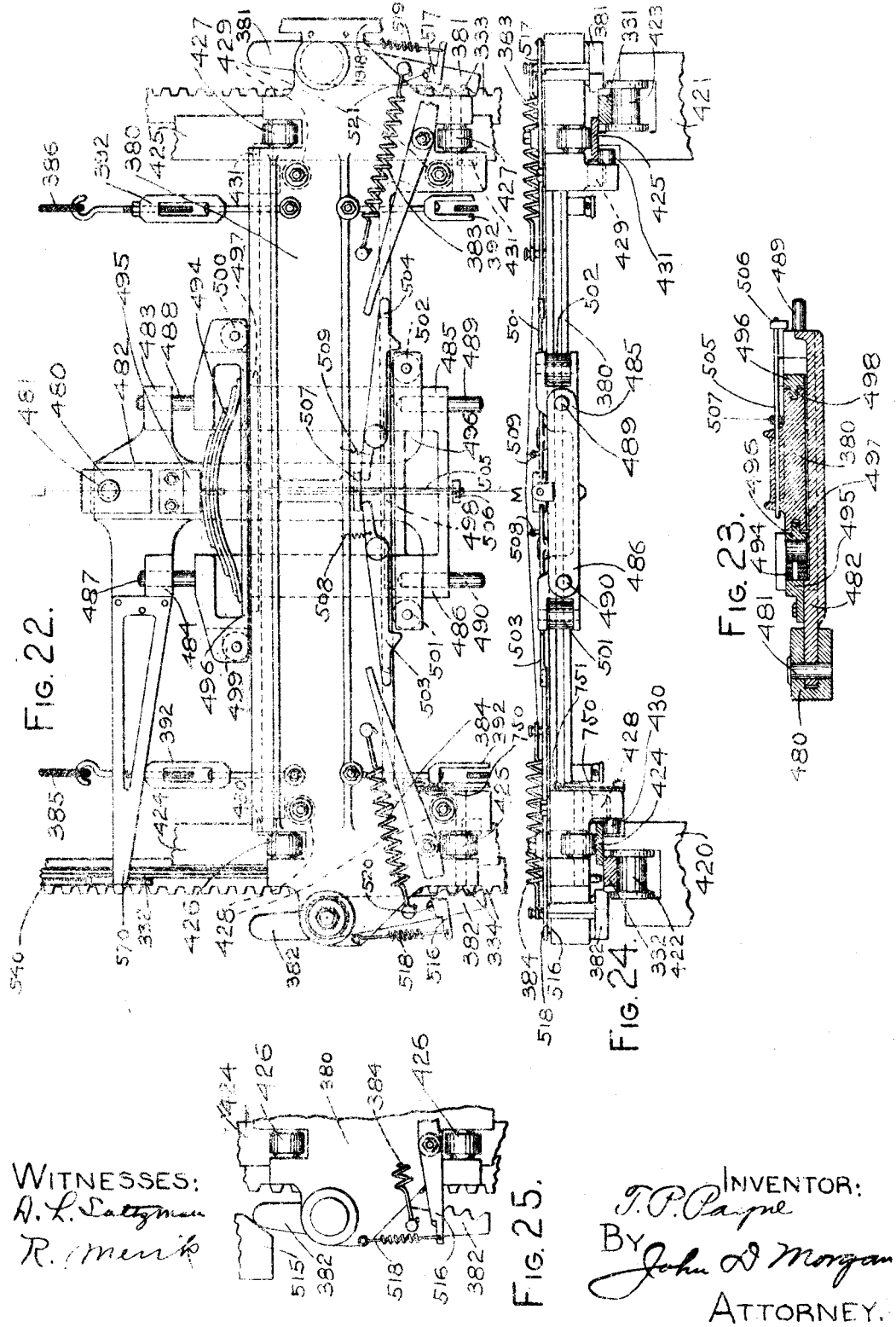

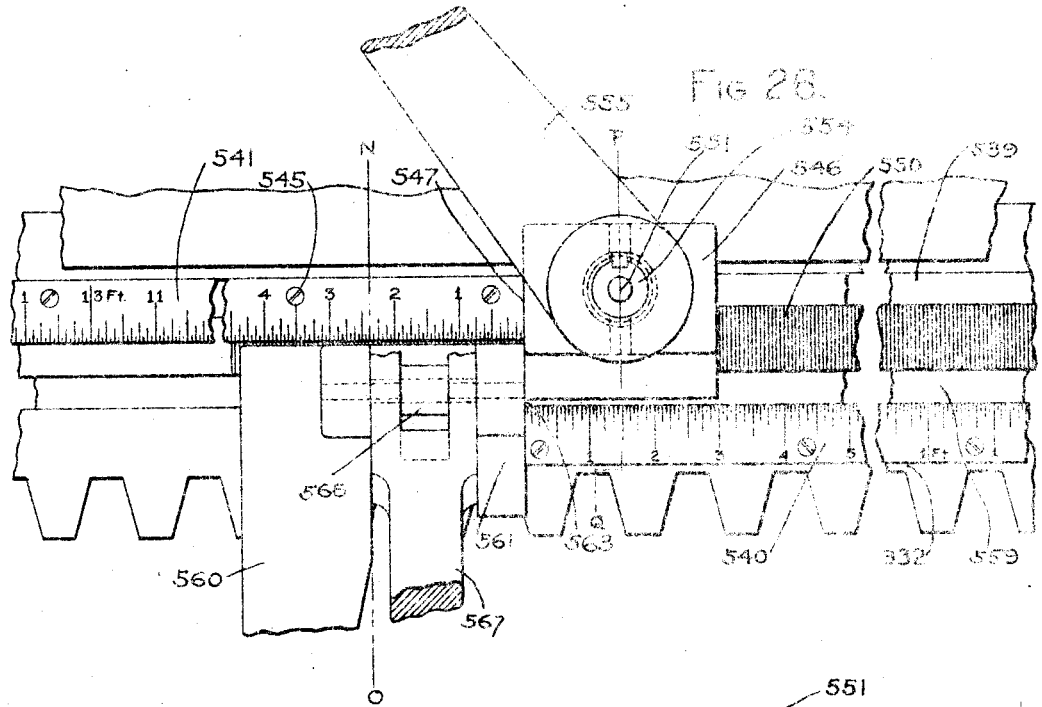
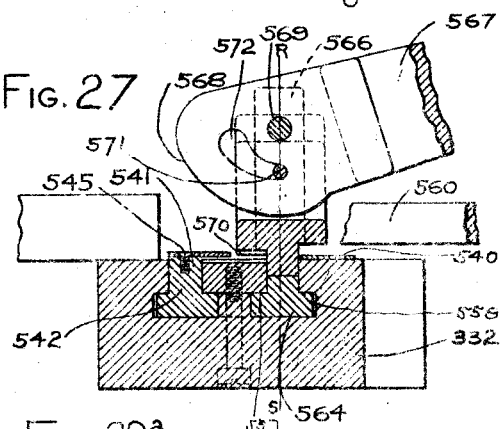
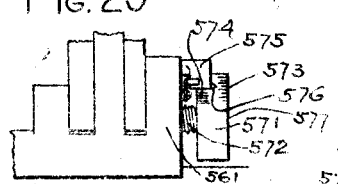
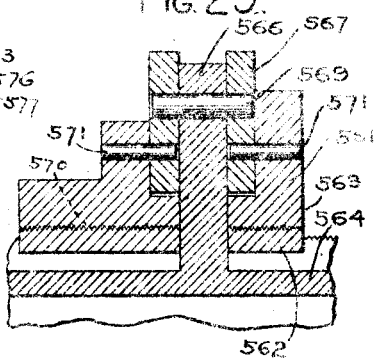

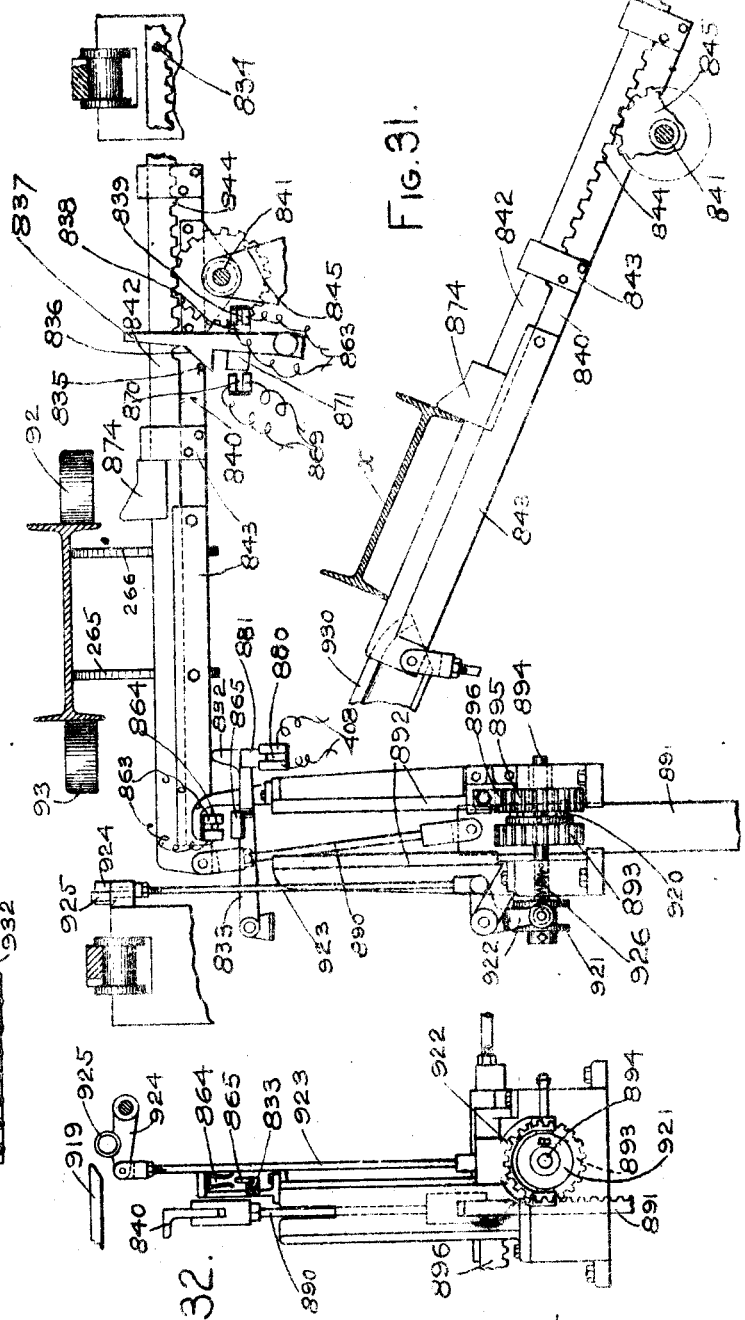

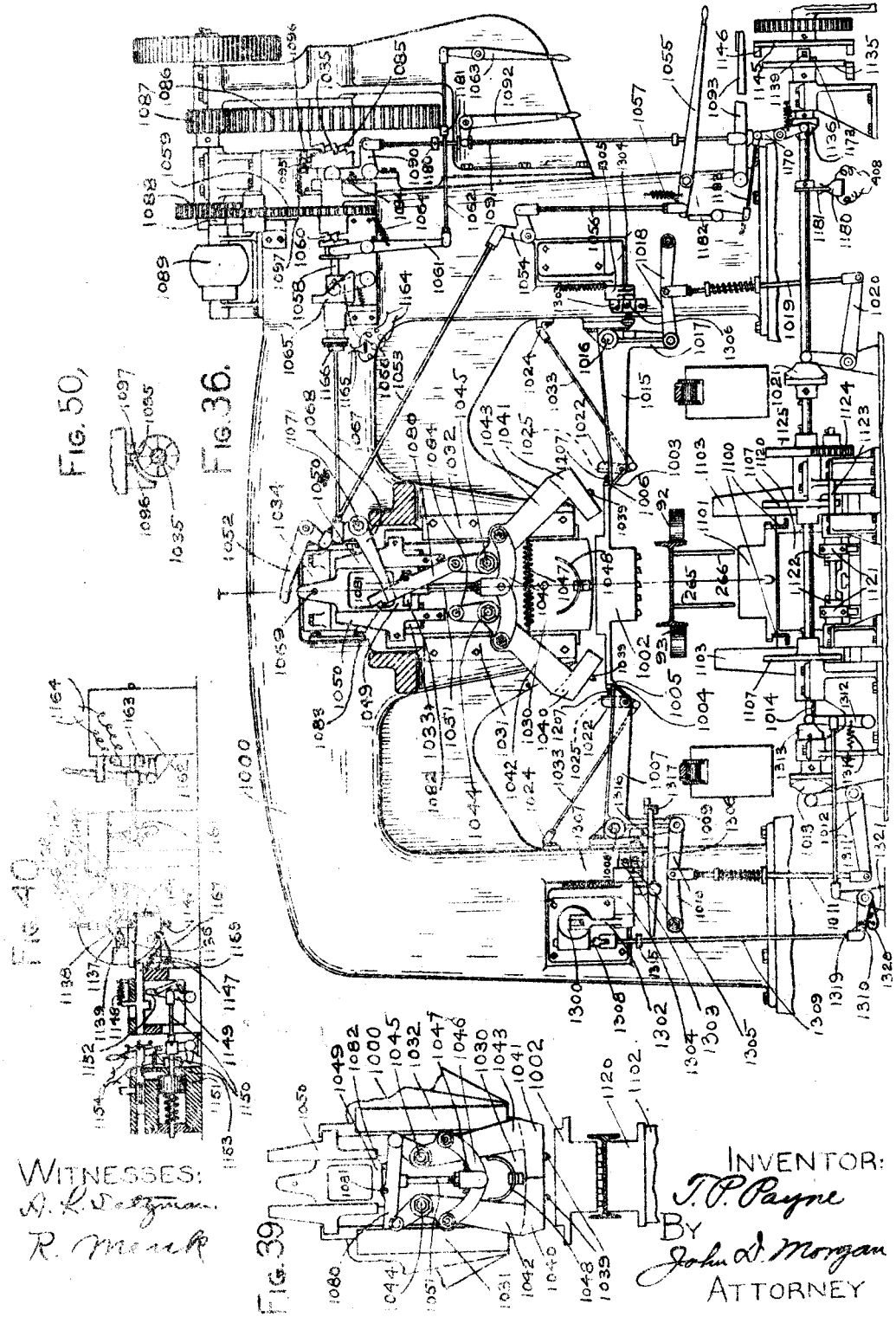

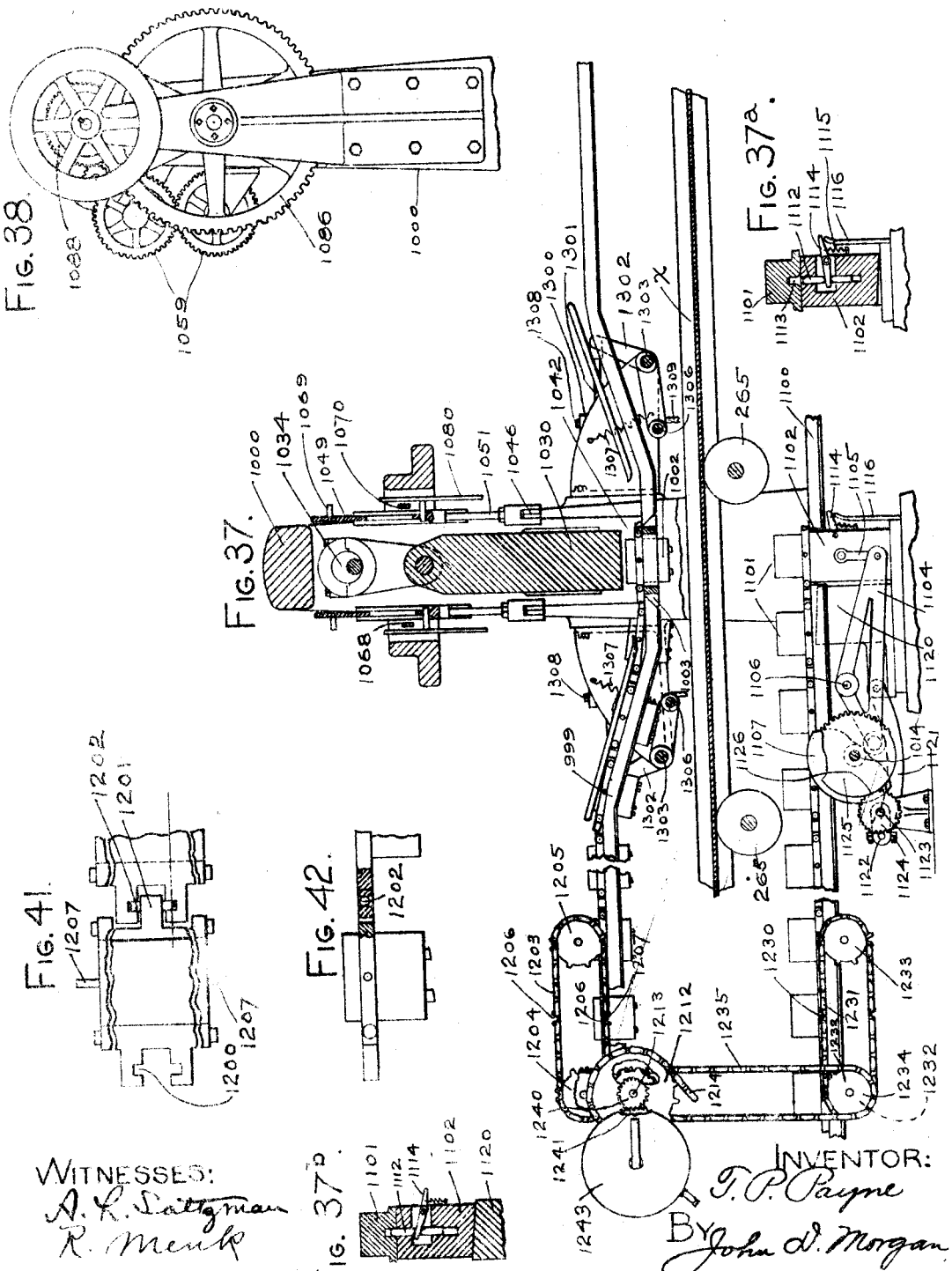
T. P. PAYNE.
METAL WORKING MACHINE.
APPLICATION FILED MAY 3, 1909.
1,075,491. Patented Oct. 14, 1913.
16 SHEETS—SHEET 3.

T. P. PAYNE.
METAL WORKING MACHINE.
APPLICATION FILED MAY 3, 1909.
1,075,491.
Patented Oct. 14, 1913.
16 SHEETS—SHEET 14.
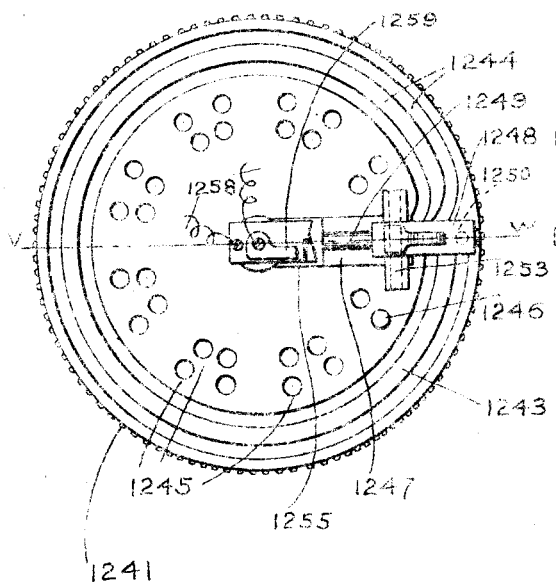
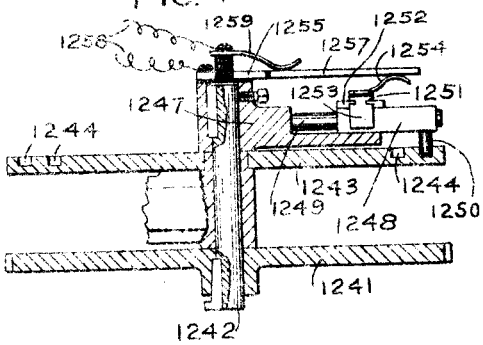
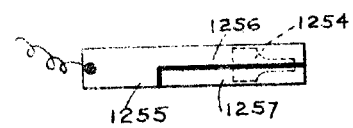
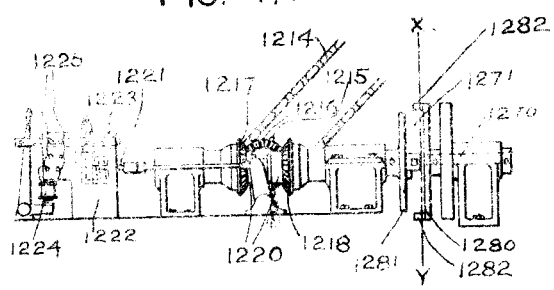
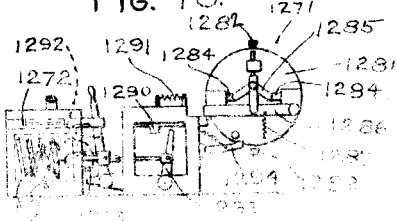
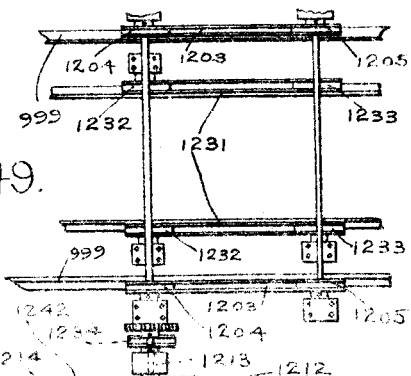
WITNESSES:
A. L. Setzman
R. Menk
INVENTOR:
T. P. Payne
BY John D. Morgan
ATTORNEY.

T. P. PAYNE.
METAL WORKING MACHINE.
APPLICATION FILED MAY 3, 1909.

1,075,491.

Patented Oct. 14, 1913.
16 SHEETS—SHEET 15.

WITNESSES:
D. L. Saltzman.
R. Menk

INVENTOR:
T. P. Payne
BY John D. Morgan
ATTORNEY.

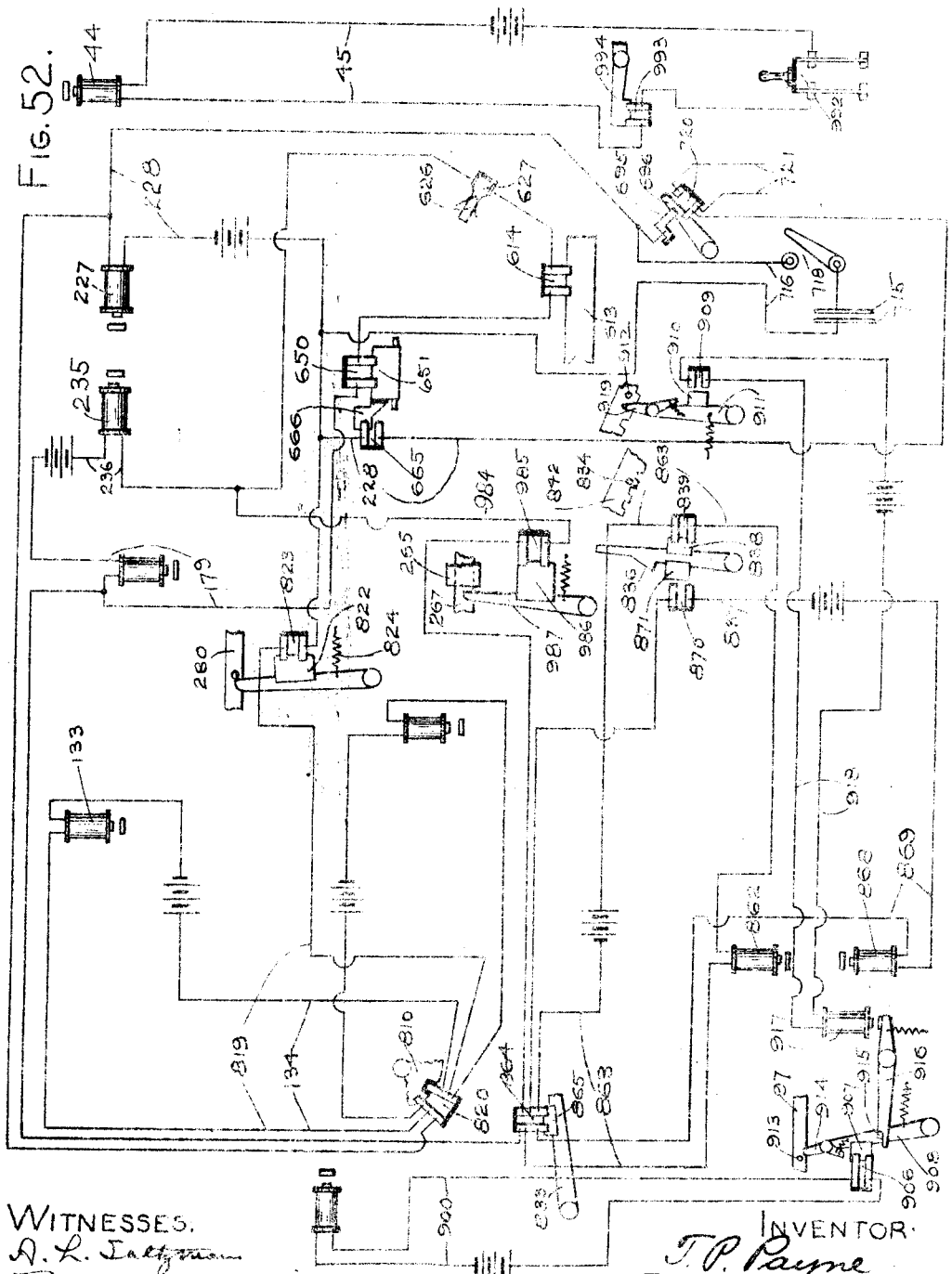

UNITED STATES PATENT OFFICE.

THEODORE P. PAYNE, OF NEWARK, NEW JERSEY.

METAL-WORKING MACHINE.

1,075,491.  Specification of Letters Patent.  Patented Oct. 14, 1913.

Application filed May 3, 1909. Serial No. 493,596.

*To all whom it may concern:*

Be it known that I, THEODORE P. PAYNE, a citizen of the United States, residing at Newark, in the county of Essex and State of New Jersey, have invented new and useful Improvements in Metal-Working Machines, of which the following is a specification.

The invention relates to machines for fabrication of metal shapes and other materials, and more particularly to machines for placing and piercing holes in beams, plates and other structural shapes, although in certain of its aspects the invention may be useful in other connections.

Objects of the invention are to provide a machine for rapidly performing operations in predetermined positions by tool equipped means upon work progressed through the machine; to provide a machine for rapidly placing successive holes, or groups of holes, in a structural shape, or other work, without a preliminary laying out; to provide for mechanical or automatic handling of the work in positioning it relative to the means for operating thereon; to provide control of the devices for moving the work whereby they are absolutely, and if desired, automatically controlled; to position the work so that successive holes or groups of holes, or other operations, will be in proper relation to each other and to the work without the usual laying out upon the material itself; to provide for mechanical or automatic centering and adjusting of the work upon the machine and relatively to the piercing devices or other tool equipped means; to provide for automatic supply of work to the machine up to its capacity; to provide for a mechanical and automatic removal of the work from the machine as soon as the operations thereon are completed; to provide for successively repeating the placing of holes automatically by the machine;
to provide for automatic control of one group of mechanism by another to bring them into proper sequential operative relation with the work; to provide a machine requiring a minimum of labor and of attendance for the work done and with a minimum of preparatory work; to prevent other than a proper sequential operation of the machine by an operative; to provide for making in rapid succession groups of holes varying in number and in position with respect to each other; to provide mechanism for easily and rapidly utilizing different piercing devices successively on the work; to provide for making the piercing of a shape a rapid and purely mechanical operation succeeding immediately on the other steps in its manufacture.

Other objects of invention will in part be obvious and will in part more fully appear herein.

The invention consists in the novel parts, mechanism, combinations and improvements herein shown and described.

The accompanying drawings, referred to herein and forming a part hereof, illustrate an embodiment of the invention, the same serving in connection with the description herein to explain the principles of the invention.

Figure 18:
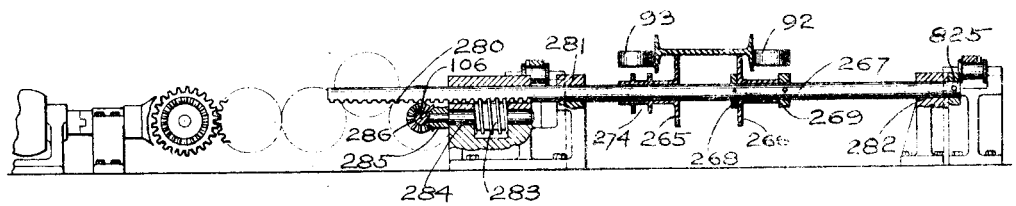
Figure 19:
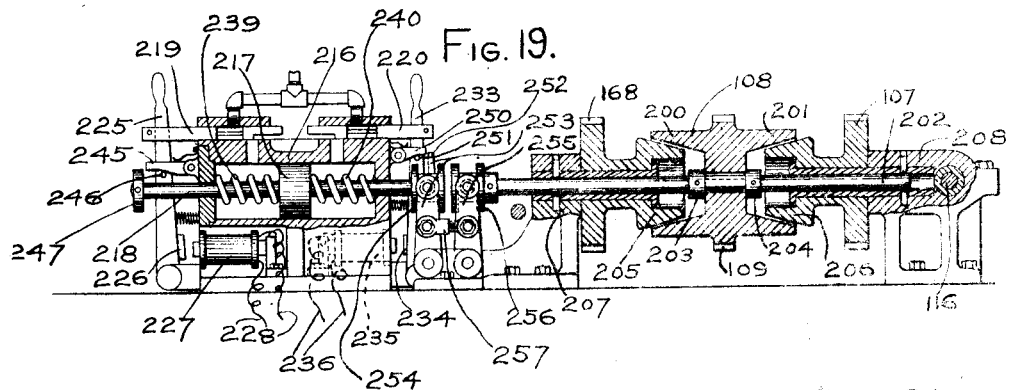
Figure 20:
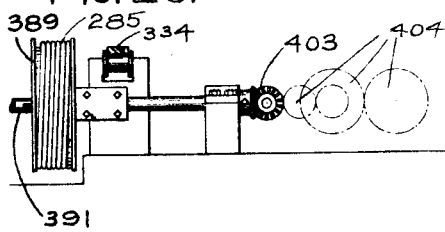
Figure 21:
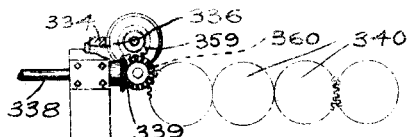

Of the drawings: Figures 1 to 4, inclusive, represent a single plan of a machine constructed in accordance with the principles of the invention, the sheets running in the order of their numerals and from left to right; Fig. 4ª is a fragmentary plan of parts of the work alining and progressing means; Figs. 5, 5ª, 6, 7 and 7ª, are details in elevation of the work supplying means and portions of the work progressing means; Fig. 8 is a detail corresponding to the lower portion of Fig. 7 viewed at right angles; Fig. 9 is a transverse elevation partly in section substantially on the line A—B of Fig. 2; Fig. 10 is a partial vertical section substantially on the line C—D of Fig. 2; Figs. 11 and 12 are enlarged detail elevations corresponding to parts of Fig. 9, and showing the mechanisms in different relation to the work; Fig. 13 is an enlarged elevation, partly in section, of parts shown in Fig. 9; Fig. 14 is a fragmentary elevation looking from the right at Fig. 13; Figs. 15, 16, 16ª and 17 are details in elevation of certain of the work centering devices; Fig. 18 is a transverse elevation partly in section substantially on the line I—K of Fig. 2; Fig. 19 is a transverse sectional elevation substantially on the line G—H of Fig. 2; Fig. 20 is a fragmentary detail, in elevation, of a portion of the drive for the right bridge; Fig. 21 is a detail, in elevation, of parts of the driving mechanism for the left bridge and carriage; Fig. 22 is a plan view of the right bridge; Fig. 23 is a sectional view on the line L—M of Fig. 22;

Figure 33:
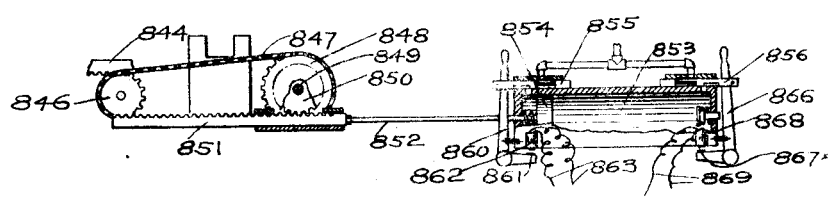
Figure 51:
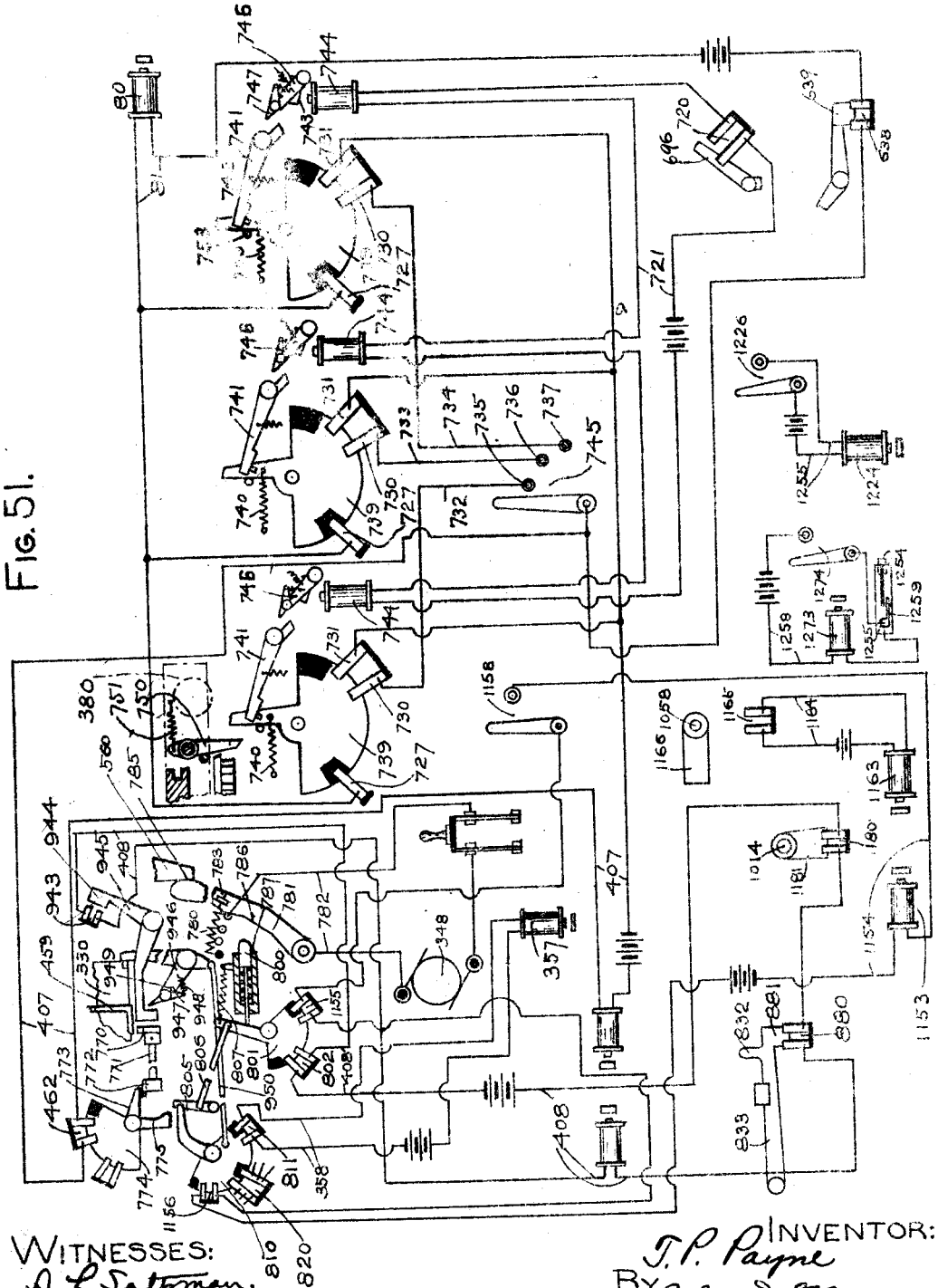

Fig. 24 is an elevation corresponding to Fig. 22 looking toward the left; Fig. 25 is a fragmentary detail of the bridge dog; Fig. 26 is an enlarged plan of portions of the distance determining devices; Fig. 27 is a detail, partly in section, on the line N—O of Fig. 26; Fig. 28 is a detail, partly in section, on the line P—Q of Fig. 26; Fig. 29 is a detail, in section, on the line R—S of Fig. 27; Figs. 29ª and 29ᵇ are details of a different form of certain parts of the distance determining devices; Fig. 30 is an elevation of portions of the mechanism for feeding off the work; Fig. 31 is an elevation of certain parts shown in Fig. 30 in a different position; Fig. 32 is a fragmentary elevation of certain parts shown in Fig. 30 viewed at substantially right angles from Fig. 30; Fig. 33 is a detail of the actuating devices of the mechanism shown in Fig. 30; Figs. 34, 34ª and 35 are details of a different form of the transverse work positioning means; Fig. 36 is an elevation of the tool equipped means and its support; Fig. 37 is an elevation, parts in section, substantially on the line T—U of Fig. 36; Figs. 37ª and 37ᵇ are fragmentary details of the die block positioning devices; Fig. 38 is an elevation, looking to the left, of the upper right hand portion of Fig. 36; Fig. 39 is a fragmentary elevation of certain parts shown in Fig. 36 in different positions; Fig. 40 is a detail, partly in section, of the controlling devices for the actuating means for the punch and die blocks and associated parts; Fig. 41 is a detail, in plan, of a form of punch block; Fig. 42 is an elevation, with certain parts in section, corresponding to Fig. 41; Fig. 43 is an elevation of portions of the locating and controlling means for the punch and die blocks; Fig. 44 is a sectional view substantially on the line V—W of Fig. 43; Fig. 45 is a detail plan of the pole pieces and bridge shown in Fig. 44; Fig. 46 is an end elevation of certain parts shown in Figs. 43 and 44; Fig. 47 is a detail elevation of portions of the driving mechanisms for the punch and die block train; Fig. 48 is an elevation looking to the left on the line X—Y of Fig. 47; Fig. 49 is a plan of the parts shown in Fig. 48 and certain parts associated therewith; Fig. 50 is a detail of the clutch throw out for the tool equipped means; Figs. 51 and 52 are diagrammatic views of certain of the circuits.

Referring by way of example to the accompanying drawings, which illustrate one embodiment of the invention, means are provided for supplying the structural shapes, or other material to be operated upon, to the machine. The form of such means shown comprises devices for successively supplying shapes to the progressing means which in turn presents them in proper position to be operated on by the tool-equipped means. Said supplying means, as illustrated, comprises a conveyer 1 which may be continuously driven, said conveyer having sprocket chains 2, provided with engaging lugs 3 passing over suitable sprocket wheels 4 which may be loosely mounted on the shaft 5. The illustrated form of supplying means comprises further a conveyer for receiving the shapes from the conveyer just described and for supplying them to the progressing means as needed thereby. In accordance with one feature of the invention, said supplying means act to supply the shape as soon as the progressing means is ready to receive it, and may also be called into action by the progressing means. It is shown herein as a series of sprocket chains 8 provided with engaging devices, or lugs 9, said chains passing over sprocket wheels 10, which may be conveniently carried loose on the shaft 5. Said sprocket chains 8 are also shown passing over sprocket wheels 11 which may be fixed on a shaft 12. A suitable drive is provided for said conveyer, and as shown herein comprises a sprocket wheel 13 likewise fixed to shaft 12 carrying sprocket chains 14. The sprocket chains 14 are carried by sprocket wheels 15 fixed on a shaft 16, said shaft having fixed thereto also a gear 17.

For the purpose of operating the supplying means in harmony with the movements and positions of the progressing means, and also to provide for the control or government of said supplying means by the progressing means, as contemplated by certain features of the invention, suitable driving and controlling means for said supply means are provided. In the illustrated form of such means a gear 18 is shown meshing with the gear 17. Fixed with respect to the gear 18 is shown a member 19, and in coöperative relation therewith devices for calling it into action and again for arresting it. A continuously driven disk 20 is shown provided with lugs 21. On the member 19 is shown a slidable piece 22 movable into and out of the path of a lug 21, so as to cause the member 19 to rotate with the disk 20 or to remain at rest. In engagement with said slidable pin 22 is shown an arm 23 pivoted on the member 19 and acted on by a suitable spring 24. Located so as to be moved into and out of the path of said arm 23 is shown a slidable detent 25 pressed in one direction by a suitable spring 26. Said spring is used herein to project the detent 25 into the path of the arm 23. Suitable means for actuating the slide 25 against its spring are provided, and as shown herein comprise a pivoted arm 31, the end of which may engage with a lug 32 upon said slide 25. The end of the arm 31 is provided with a pivoted spring pressed latch 33 to permit the return or idle movement of the arm 31 with respect to the detent 25. Pivoted to said arm 31 is shown a rod 34 connected to a piston 35 working in a cylinder 36. As shown herein the piston 35 is impelled in one direction by a spring 37, and in the opposite direction preferably by fluid under pressure. In the form of control by the progressing means shown herein, a suitable valve 41 for controlling the supply of fluid pressure is provided, and said valve is further shown electrically controlled. There is shown pivoted to said valve a bent lever 42 connected to an armature 43 in operative relation with a magnet 44 in the circuit 45. The controlling connections for the circuit 45 will be later described.

The manner of operation of the mechanism just described is substantially as follows: The energizing of the magnet 44 serves to move the valve 41 to admit the fluid under pressure to the cylinder 36. The arm 31 is thus swung to retract the detent 25, thus permitting the spring 24 to actuate the arm 23 to project the pin 22 into the path of the lugs 21. The same movement will throw the arm 23 past the detent 25, said detent being then immediately returned through the action of the spring 26. The engagement of the lug 21 with the pin 22 will cause the member 19 and gear 18 to rotate with the disk 20. The sprockets 8 will thus be driven until the arm 23 again engages the detent 25, thus rotating the arm 23 against its spring and thereby retracting the pin 22 from the path of the lugs 21. Upon the deënergizing of the magnet 44, the spring 40, acting through the lever 42 moves the valve 41 from position for admitting the pressure fluid to the cylinder 36 to the exhaust position. The latch 33 permits the arm 31 to return to operative position with respect to the lug 32, the spring 26 having previously acted to throw the detent 25 back into the path of the arm 23 as already explained. The parts may be so proportioned that a single rotation of the member 19 and gear 18 will serve to travel a shape or other material a distance sufficient to deliver it to the mechanism which receives it from said conveyer.

Means are provided, in certain aspects of the invention for controlling or positioning the progressing means, or portions thereof, by the supplying of the shape or other material, and in accordance with one feature of the invention, mechanisms are provided which are controlled by the size or dimension of the supplied material to correspondingly position the progressing means.

In the illustrative embodiment, and in accordance with certain features of the invention, means are provided for transferring the shape or other material from the conveyer to the progressing means.

The form of progressing means provided in the present embodiment comprises means for positively and firmly engaging the shape and for progressing and positioning it accurately with respect to the tool-equipped means for operating upon the shape, and also supporting devices for supporting the shape during the progression thereof. It will be understood, however, that in accordance with certain features of the invention the progressing means may include either or both kinds of devices. The supporting devices for the shape or other material provided in the present embodiment are arranged to be in rolling contact with the progressed material, and are shown herein in the form of disks, rotatably mounted upon suitable supports. In certain aspects of the invention means are provided for positioning said disks, or other supporting devices both relatively to the tool-equipped means heretofore mentioned, and also one of said disks relatively to the other to accommodate them to shapes or other materials of different sizes. The form of such positioning and controlling means included in the present embodiment will be described at a later point, but the controls therefor will be described in connection with the particular embodiment of transferring means. In the illustrated embodiment furthermore, the shape or other material may be progressed by gravity on the transfer means, and such a form thereof is shown herein.

The illustrated form of transferring means comprises a plurality of rails 55 mounted to swing about a shaft 56. Suitable means are provided for swinging the rails in order to provide relative movement between the rails and the progressing means whereby the shape may be transferred from the former to the latter. The rails 55 are shown herein with links 57 pivoted thereto, said links being also pivotally connected to rack bars 58 working in guides 59. Pinions 60 are shown in mesh with the rack bars 58 and also meshing with rack bars 61. Suitable means for actuating the rack bars 61 are provided, and they are shown herein connected to a piston 69 working in a cylinder 70. A fluid under pressure may be employed to control the movement of the mechanisms just described. A valve 71 as shown herein, is movable into position to admit the fluid into the cylinder 70 or to release it therefrom. A suitable inlet for fluid under pressure is shown at 72 and an exhaust port at 73. The exhaust port may be supplied with means for regulating the flow therethrough. The piston 69 may, if desired, be also supplied with suitable buffer springs 75 and 76.

Suitable means for controlling the valve 71 are provided, and as shown herein it is in operative connection with a spring controlled bent lever 77. The lever 77 is shown connected to an armature 79 of a magnet 80 in the circuit 81. The control for the circuit 81 will be hereinafter described.

Suitable means are provided for alining and guiding the shape or other material to be operated on relatively to the progressing means and in the form thereof disclosed in the drawing, rolls 92 and 93 are shown arranged to firmly engage and hold the shape, said rolls being positionable in a plurality of definite and predetermined positions relatively to the tool-equipped means. The alining rolls 92 and 93 are further arranged to be relatively fixed with respect to each other to receive into operative relation and to engage shapes or other material of different forms and sizes and to move the material bodily while so held. The rolls 92 are shown pivotally mounted on blocks 96 fixed on rack bars 97 slidably mounted in the machine frame, as shown at 98 in Figs. 2 and 9. In mesh with the rack bar 97 is shown a worm 99 fixed on the shaft 101. Miter gears 100 connect said shaft 101 to the shaft 106. The shaft 106 is driven by suitable means shown herein as a gear train 107. Said gear train is shown in operative relation with a suitable friction clutch 108 provided with a gear 109 in mesh with a gear 110 fixed to rotate with a bevel gear 111.

At 115 is shown a motor, or other suitable source of energy, connected to a shaft 116. Loose on said shaft and in mesh with the bevel gear 111 are shown opposed bevel gears 117 and 118. Splined on the shaft 116 is shown a sliding clutch member 119 arranged to clutch either the bevel gear 117 or 118, thus driving the gears 111 and 110 and their connected mechanisms in either direction as desired. Suitable means for shifting the clutch member 119 are provided, the illustrated form thereof including a yoke 122 fixed to a shaft 123 to which is also fixed a lever 124. Said lever is connected to a piston rod 125, its piston 126 working in the cylinder 127. Said piston may be impelled in one direction by a spring 128 and in the other direction by fluid pressure. To control said fluid pressure, a valve 130 is provided which serves in one position to admit and in the other position to release the fluid under pressure. Connected to said valve is shown a spring pressed lever 131 carrying an armature 132 in operative relation with a magnet 133 which is in a circuit 134, the connections of said circuit being hereinafter described.

Suitable means are provided for holding the opposed alining rolls 92 and 93 in fixed relation with each other, said means being constructed and arranged to also permit the relative movement of the rolls with respect to each other. The illustrated form of such mechanism will be described shortly, and it will be seen from the foregoing that when the rolls 92 and 93 are fixed with respect to each other that the rotation of the worm 99, acting through the rack 97, will serve to move the shape or other material transversely of the direction of progression with respect to the tool-equipped means. Each set of alining rolls 92 and 93 is shown provided with miter gears 100 connecting it to the rotating shaft 106. Motion is communicated from the motor 115 to said shaft 106 through the mechanism just described, the clutch 108 serving to connect or disconnect the drive to start or stop the shaft 106. The gears 117, 118 and 111, with their controlling mechanisms, already described, serve to determine in which direction the alining means shall be moved. As before stated, the alining rolls 92 and 93 are movable relatively to each other to increase or decrease the space therebetween, and in the present embodiment the support 150 on which the roll 93 is rotatably mounted, is in turn slidably mounted upon the rack bar 97.

Means are provided in one aspect of the invention for permitting the alining means to yield for any inequalities or defects which may be present in the beam, while at the same time compelling the beam to progress in alinement with the setting of the alining means. In the present embodiment the support 150 is shown slidably mounted in the box 151 and being under the impulsion of a spring 152. Connected to the box 151 are suitable moving and positioning means shown herein in the form of cables 159, passing over idle drums 160 and also over drums 161 fixed on the shaft 162. Suitable adjusting devices for said cables may be provided for both tension and position and the form thereof shown herein comprises turn buckles 163. The shaft 162 is shown connected with a shaft 169 by miter gears 164. Loose on the shaft 169 is a worm gear 165 meshing with a worm 166 fixed with respect to a gear 167. Said gear 167 in turn meshes with a gear 168 in operative relation with the clutch 108. Suitable means are provided for connecting and disconnecting the shaft 169 and the worm gear 165, in order that the mechanism may be driven through other connections if desired. Splined on the shaft 169 is shown a clutch member 174 and connected therewith suitable means for moving it into and out of engagement with the clutch member 175 fixed to the worm gear 165. Suitable devices for throwing in and out the said clutch may be provided, which may be of substantially similar form to the one previously described in connection with the gears 111, 117 and 118. No detail description thereof need be given. The yoke is indicated by the reference numeral 180, the lever arm by 176, the cylinder by 177, the valve actuating mechanism by 178, and the circuit by 179.

It may be convenient in certain operations to cause the supporting disks of the progressing means to move into a preliminary position with the alining means in the general adjustment for the size or shape of the work. Accordingly, the invention, in one of its features, provides means for effecting this joint movement. The form of progressing means shown in the present embodiment comprises rotatably mounted disks 265 and 266 rotating loosely upon the journals 267.

Suitable means for controlling the clutch 108 are provided, and the embodied form thereof is shown in detail in Fig. 19 of the drawings. Fixed with respect to the spur gear 109 are shown the clutch members 200 and 201, the whole being splined and held in position on the shaft 202 by suitable collars 203 and 204. Fixed to the last gear of the train 107 is a clutch member 206, and fixed with respect to the gear 108 is a suitable clutch member 205. The shaft 202 is shown slidable in the bearings 207 and 208 to clutch or connect the gear 109 either to the train 107 or to the gear 108. The gear 110 is shown of sufficient width to permit this movement and at the same time to remain in mesh with the gear 109.

Means for moving the shaft 202 to connect the gear 109, which is driven from the motor 115, with either of the gear trains, or to maintain it disconnected from both are provided. In the illustrated form of such means, there is comprised a fluid pressure cylinder 216 provided with a piston 217. The piston may be maintained at either end of its travel or in an intermediate position, and is shown in Fig. 19 of the drawings in such intermediate position. Connected to the piston 217 is shown a rod 218 projecting from the ends of the cylinder. Valves 219 and 220 are shown controlling both the admission and emission of fluid under pressure into and from the respective ends of the cylinder. The valve 219 is shown connected to a spring-pressed lever 225 carrying an armature 226 in operative relation with a magnet 227 in a circuit 228. The valve 220 is shown similarly connected to a spring pressed lever 233 carrying an armature 234 in operative relation with a magnet 235 which is in a circuit 236. Means are shown for restoring the piston to its intermediate position when not subjected to fluid pressure, and the form of such means disclosed herein comprises springs 239 and 240 which may be conveniently carried coiled about the rod 218. Suitable means for insuring the stopping of the piston in its intermediate position are provided, and the illustrated embodiment thereof comprises a pivoted latch 245, which may be spring-pressed, resting on a pin 246 on the lever 225, and including also a collar 247 on the rod 218. There is similarly shown a pivoted latch 250, which also may be spring-pressed, resting on a pin 251 carried by the lever 233 and coöperating therewith a lug 252 fixed relatively to the rod 218.

Suitable connections between the clutches and the piston 217 are provided and as shown herein a pivoted yoke 253 is shown engaging a collar 254 fixed on the rod 218 and a pivoted yoke 255 engaging a collar 256, fixed upon the shaft 202. The yokes 253 and 255 are shown connected by an adjustable link 257 to permit adjustment between piston 217 and clutch 108.

It will be understood that with the arrangement shown, the closing of circuit 228 will actuate the lever 225 to operate the valve 219 to admit fluid under pressure to the left hand end of the cylinder as shown in Fig. 19, causing the piston to travel to the right. The latch 245 is at the same time lifted by pin 246 to permit the collar 247 to pass. The spring 240 will at the same time be placed under tension between the piston and the piston head. This will move the shaft 202 to the right and connect the driven gear 109 to the gear 107. Upon breaking the circuit 228, the lever 225 acts under the impulsion of its spring to operate valve 219 and the fluid in the cylinder is released and the piston returned under impulsion of the spring 240. The latch 250 engages the stop or lug 252, and the latch 245 is permitted to drop in front of collar 247 to arrest the piston in its intermediate position. The operation of the mechanism on the opposite side is substantially the same.

By one feature of the invention, means are provided for preliminarily positioning the work-supporting devices to receive work of different shapes and sizes. As hereinbefore stated, said supporting means comprises members in rolling contact with the work, and are shown herein as disks 265 and 266 carried upon a suitable journal 267. In the present embodiment one of said disks is movable relatively to the other for said preliminary positioning. Furthermore, said disks are movable together transversely to the path of travel of the work to permit of the positioning of the work relatively to the tool-equipped means for operating thereon. In the present embodiment the disk 266 is shown fixed in position upon the journal 267 by collars 268 and 269. The disk 265 is shown having a hub 274, sleeved upon the journal 267. Means are shown herein for causing the loose or independently movable disks 265 to move in unison with the independently movable alining rolls 93. In the form of such means illustrated herewith an annular groove is shown upon the hub or sleeve 274 of the disk 265 which is engaged by the member 275 fixed to the box 151 of the alining means.

The form of means for moving the disks 265 and 266 together transversely of the path of travel of the work comprises a series of teeth 280 fixed relatively to the journal rod 267, said rod being slidable in bearings 281 and 282. Meshing with the teeth 280 is shown a worm 283 fixed to a shaft 284, said shaft carrying the bevel gear 285. The gear 285 meshes with a corresponding gear 286 on the shaft 106.

Means are provided for holding the alining rolls 92 and 93 in fixed relation with each other, or permitting one to move relatively to the other. The illustrated form of such means (see Figs. 9, 13 and 14) comprise a toothed rack 294 fixed to the box 151 and engaging therewith a detent 295 carried by the lever 296, pivoted to the supporting member 96 for the alining roll 92. A spring 297 is shown holding the detent to the rack. An arm 298 is shown fixed to the lever 296 and in operative relation therewith a lever 299. Said lever is shown pivotally connected to a rod 300, which in turn is pivoted to a trip 301 actuated in a manner hereinafter described.

It will be understood in the mechanism just described the series of alining rolls 93 and the series of disks 265 may be actuated from the motor 115 through the action of the drums 161 on the driven shaft 162, through the clutch members 200, 205 and 174, 175. Provision has been made also, so that the disks 265 and 266 are movable together and so that all the alining rolls 92 and 93 are movable together, and the alining rolls and disks are movable together when desired, through the bevel gears connecting them to the shaft 106, and through the clutch 108 from the motor 115.

As hereinbefore indicated, the form of progressing means illustrated herein comprises means for positively and firmly engaging the shape and for progressing and positioning it accurately with reference to the tool-equipped means for operating upon the work. This is necessary where the various operations upon the work must be accurately placed. The present form of such means comprises a member with respect to which the work is accurately positioned and firmly held, said means being connected to suitable feeding or driving means and being in operative relation with distance determining means and with means for nicely and positively controlling its movement in correspondence with the distance determining means. Said member is indicated herein by the reference numeral 330, and may for convenience be called the left hand bridge. The bridge 330 is shown herein fixed with respect to the members 331 and 332. In this embodiment the connection to the driving means is effected through these members and they are accordingly shown provided with toothed racks 333 and 334. In mesh with said racks, respectively, are shown worms 335 and 336. The worm 335 is shown connected by miter gears 337 to the shaft 338. Said shaft is shown connected by miter gears 339 to the gear train 340 which connects with the clutch member 341, which coöperates with the clutch member 342, carrying a gear 343 in mesh with a gear 344. Fixed to rotate with the gear 344 is a bevel gear 345 meshing with which are the loose gears 346 and 347. A motor 348 is shown connected to the shaft 349, and splined thereto is a clutch member 350, movable to clutch either the gear 346 or 347 to said shaft 349. Said clutch is shown having a yoke 351 connecting by a shaft 352 and a lever 353 with the piston rod 354 of the cylinder 355. Said cylinder is provided with a valve 356 controlled by a magnet 357 in the circuit 358. The construction of said parts may be substantially similar to those shown in connection with the gears 116, 117 and 118, and the cylinder 127, and further detailed description is unnecessary. The worm 336 has fast on its shaft a pinion 359 meshing with a pinion 360 which is geared to the train 240.

Means are provided which together with other functions, serve to press the work firmly against the left hand bridge 330 and then to firmly hold the work thereto as it is progressed through the machine. Said means comprise a member 380 which may for convenience be styled the right hand bridge. This bridge 380 is shown attachable to and detachable from the members 331 and 332. As shown herein the bridge 380 is provided with pivoted, toothed dogs 381 and 382, which under the impulsion of springs 383 and 384 tend to engage with the rack teeth 333 and 334. Said mechanism, it may be observed will permit said bridge 380 to move toward the bridge 330, but will firmly lock it to the members 331 and 332 when at rest, and will also prevent movement in the opposite direction until the dogs are thrown out of engagement with the rack teeth. Means are provided for also progressing the bridge 380 along its path of travel independently of the bridge 330. The form of such means shown herein comprises cables 385 and 386 working over loose pulleys 387 and 388 and over drums 389 and 390, said drums being fixed on the shaft 391 the cables returning again to fastenings on the bridge 380. Adjustments of suitable form may be provided, if desired, such as turnbuckles 392. The shaft 391 is shown connected by miter gears 403 to a gear train 404, connected to the clutch member 405, said clutch member being in operative relation with the clutch member 342. The clutch members 341, 342 and 405 may, if desired, be of the same general construction as the clutch members 108, 205 and 206 heretofore described and shown in Fig. 19, of the drawings. Actuating and controlling mechanisms for holding the member 342 out of engagement with both the members 341 and 405 or for moving it into clutching engagement with either of said members may be provided. This mechanism may also be substantially similar to that shown in Fig. 19 and it is indicated generally by the reference numeral 406 and need not be described in detail. The circuits leading therefrom are marked 407 and 408 respectively, and their connections and controls will be later described.

Means are provided for effecting the various movements and feeds of the bridge 380, of the bridge 380 and the combined feed or travel of the two bridges together. On supports 420 and 421 are rotatably mounted rollers 422 and 423 on which rollers the members 331 and 332, to which the bridge 330 is attached, rest and travel. It will be understood that the worms 325 and 326 working in the rack teeth of the members 321 and 332 progress them to and fro along the series of rollers 422 and 423 or hold said members at rest upon said supporting rollers. Upon the supports 420 and 421 are supported rails 424 and 425. Upon these rails the bridge 380 is supported and travels. Rolls 426 and 427 are shown rotatably attached to the bridge 380 and traveling on the tops of the rails 424 and 425, and similar rolls 428 and 429 bear upon the edges of the rails and rolls 430 and 431 upon the bottom side. It will thus be seen that the bridge is firmly held in alinement.

Means are provided in connection with the bridge 330 for contacting with the face of the work to accurately position it relatively to the different indicating and determining devices. In the present embodiment, the bridge 330 is shown provided with a head 450 having a pivoted bearing 451 to permit a slight angular movement of the head to accommodate variations in the contacting face of the work.

While adjustment of the work transversely of the direction of progress through the machine is usually effected before the work is pressed or clamped against the contacting surface of the bridge 330, it may occur in certain cases and with certain kinds of work that such transverse positioning or travel may be desirable after the work has been pressed against and thus positioned relatively to the bridge 330. Accordingly a form of such means is provided by the invention in one of its aspects, and in the form thereof herein shown, the contacting head or surface 450 and its pivotal bearing 451 are mounted on a support 452 slidably carried upon the bridge 330. The support 452 has tongues 453 working in corresponding grooves in the bridge 330. There are also shown rolls 454 carried by said support and working on the faces of the bridge. Means are provided for maintaining the contact piece 450 centrally of the bridge 330 until the work is positioned and pressed thereagainst and also means for releasing the contact piece 450 so that if the transverse movement of the work alluded to is desirable, it may then be effectuated. In the illustrated form thereof, there are shown detents 455 and 456 engaging the support 452. Said detents are shown as pivoted, spring pressed levers, their tails being in position to be tripped by lugs 457 and 458 fixed on the slidable rod 459. The lug 460 is also fixed on the rod 459 in operative relation with the lever 461 carried on the bridge 330. The other end of said lever 461 is in position to be actuated by the work as it moves into engagement with the contact head 450.

In the present embodiment the rod 459 is utilized to control the clutch which connects the worms 325 and 326 to the motor 318. The end of said rod 459 is adapted to actuate a bridge piece 774 between contacts 462 in the circuit 408.

The rear bridge 380 is utilized in the present embodiment to press the work against the bridge 330, or the contact head thereon, and a form of means for effecting this is provided. A contact head 480 is shown mounted on a pivot 481 carried on a support 482. The piece 482 is mounted for movement relatively to the bridge 380 in the direction of travel of the bridge. It is shown herein provided with apertured lugs 483, 484, 485 and 486 in which work guiding and supporting pins 487, 488, 489 and 490. Said member 482 is acted on by suitable yielding means so as to create tension between it and its support. In the present embodiment a spring 494, which may be a reinforced bow spring, if desired, is shown acting against a lug 495 fixed on the member 482. Means are provided also, if desired, for permitting movement of the surface which contacts with the work transversely of the axis of the work, and in the illustrated form of such means a support 496 is provided slidable on the bridge 380. Said member is provided with tongues 497 and 498 working in corresponding grooves in the bridge 380. It is further shown having rolls 499, 500, 501 and 502 bearing upon the faces of the bridge. The guiding and supporting pins 487—490, are also shown carried upon said slidable member 496 so that the contacting head 480 may move transversely of the path of travel of the work, and is also free to be placed under tension by the spring 494 which works between the lug 495 on the member 482 and suitable surfaces on the member 496.

Suitable means for holding the head 480 centrally of the bridge 380 until it is engaged and pressed against the work, and for then releasing it for possible transverse movement are provided. The illustrated form thereof comprises detents 503 and 504 in the form of spring pressed levers pivoted on the bridge 380. A slidable rod 505 is shown mounted upon the bridge 380 and having a lug or trip 506 in the path of the rear portion of the supporting member 482. Thus, when the member 482 moves rearwardly as the spring 494 yields and the contact head 480 is pressed against the work, a tripping collar 507 acts against the tails of the detents 503 and 504 to release the transversely sliding member 496. The springs 508, and 509 act when pressure is removed from the head 480, to restore the rod 505 and also the detents 503 and 504 to position.

The bridges 330 and 380, as previously indicated are movable either together or independently of each other. When the dogs 381 and 382 are locked in the racks 333 and 334 the bridge 380 is connected to and is movable with the bridge 330. The bridges 330 and 380 and the connecting members 331 and 332 thus form a carriage for firmly holding and progressing the work. The carriage may then be progressed by the worms 335 and 336, the cables 385 and 386 traveling idly, the drums 389 and 390 being out of connection with the motor at the clutch member 405. The clutch member 341 is at this time in engagement with the member 342, thus connecting the worms 335 and 336 to the motor 348. Through the structure herein shown and with the manner of operation of the clutch connection at 342, it will be understood that it is impossible for the worms and the drums to be in driving or feeding relation to the right bridge at the same time. When the bridge 380 is released from the racks 333 and 334, it may then travel freely relatively thereto and to the front bridge, supported and guided by the rails 424 and 425, under the drive of its drums 389 and 390. Suitable means for disengaging the dogs 381 and 382 from their racks are provided and also means for holding them in disengaged position. Properly positioned tripping devices for the dogs may be provided and tripping cam faces 515 are shown in Figs. 2 and 25 of the drawings, acting against the tails of the dogs to move them out of engagement with the rack. Suitable detents for holding out the dogs may be provided, same being shown herein in the form of toothed levers 516 and 517 acted on by springs 518 and 519 and engaging projections 520 and 521 on the dogs. These toothed detent levers may be thrown out in any suitable manner, as by the movement of the detents 503 and 504.

Distance indicating devices in operative relation with the work holding devices are provided, and in the illustrated form thereof, a scale 540 is shown fixed upon the member 332. A scale 541 is shown fixed to a member 542 in a suitable manner, as by screws 545. Said member 542 is shown of T shaped section projecting into a groove 539 and taking underneath the shoulders 543 and 544, fixed to the member 332. The scale 541 and member 542 are slidable along the slot 539 and relatively to the scale 540. In definite relation to the scale 541 is shown a suitable stop-block 546, and means are provided for positioning a face of said stop block, in the present instance the face 547 in definite relation with the scale 540, said face 547 being also in definite relation with the scale 541 at all times. Suitable means are provided for firmly clamping the stop 546 relatively to the scale 540. In the form of such means shown herein a block 546 is shown provided with teeth 549 which engage with teeth 550 fixed relatively to the scale 540. The block 546 is shown slidably mounted in a threaded stud 551 fixed in the block or member 542 to which the scale 541 is fixed. The block 546 engages by pins 552 and 553 in an annular groove in a member 554 threaded on the stud 551. Fixed to the member 554 is an arm 555. It will be seen, therefore, that by moving the arm 555 in one direction or the other the block 546 through the teeth 549 and 550 may be brought into firm engagement with the piece 332. This brings the face 547 into definite relation with some point on the scale 540. The teeth 549 and 550 may correspond to divisions of the respective scales, thereby bringing the surface 547 to a definite division of the scale each time it is set.

According to one feature of the invention means are provided coöperating with the foregoing means for automatically positioning the work in accordance with the distance indications to which said indicating means is set. In the illustrated form thereof an arm or other suitable member 560 is shown fixed to a support 561 provided with a tongue 562 working in a groove 559 in the member 332. The support 561 is provided with a face 563 arranged to contact with the face 547 on the block 546. Means are provided for fixing the support 561 firmly in position when desired, and also for releasing it for movement along its guide way or slot. In the form of such means shown herein a T shaped piece 564 is shown working under the shoulders 557 and 558 of the slot 559. The member 564 is shown with a part 566 projecting upwardly, to which is connected by a pivot 569 a lever 567. Said lever is provided with a surface 568 eccentric to the pivot 569. The block 561 is provided on its lower surface with teeth 570, which engage the teeth 550. The block 561 is also shown provided with pins 571 engaging a suitably shaped slot 572 in the lever 567. It will be understood that when the lever is thrown in one direction the surface 568 will serve to press the teeth 570 into the teeth 550, and at the same time drawing the member 564 upwardly to clamp the structure firmly in position. When the lever 567 is thrown in the opposite direction, the member 564 presses against the bottom of its slot and the teeth 570 on the block 561 are moved free from the teeth 550 and the entire structure is free to slide along in the slot.

The manner of operation of the distance determining devices just described is substantially as follows: The zero on the scale 540 is in alinement or other predetermined relation with the end or face of the work which is in position with respect to the bridge 330. The locking arm 555 of the block 546 being in position to hold the teeth 549 out of engagement with the teeth 550, the block 546 is free to slide along in its groove. The block 546 is slid along until the face 547 gives on the scale 540 a reading equal or corresponding to the distance of the operation to be performed from the face of the work which has been positioned relatively to the bridge 330. The block 546, by movement of the lever 555 is then firmly clamped in position by the engagement of the teeth 549 and 550. The block 561 is then slid along until its face 563 contacts with the face 547, when the lever 567 is moved to firmly clamp this block in position. The arm 560 is thus positioned to coöperate with suitable mechanism, which will be hereinafter described, to control the progressing means to bring the work into proper position with respect to the tool-equipped means in accordance with the setting thus made. This series of operations is then repeated for subsequent positionings of the work.

The distance between successive operations may be read on scale 541 from the face 563 and the block 546 clamped in position in accordance with such reading. This may be repeated with each successive setting. In the meantime, the scale 540 being in fixed relation to the face of the work and to the bridge 330, the total distance from the face of the work to the last setting may be read on the scale 540 from the face 563 or face 547, thus at all times serving as a check on the work.

Means are also provided for indicating the overall distance of the work. As shown herein a pointer 570 is carried by the right bridge 380 and coöperates with the scale 540 on the member 332. This pointer gives a reading on said scale in correspondence with the head 480 which contacts with the work. The pointer 570 is therefore fixed to the member 482 which carries the head 480. It will be recalled that the other end of the scale 540 is in exact correspondence with the other end of the work, and thereby an exact determination of the length of the work is had.

Means are provided by one feature of the invention for compensating for variations in the length of the work from the desired dimension. A form of such means is accordingly provided in the present embodiment, and is shown applied to the block 561. As shown it comprises a contact head 571, having a threaded shank 572 taking into the block 561. Said head is provided with a scale 573. Means are provided for holding the head firmly in adjusted position. Said means, as shown, comprises notches 574 corresponding to the scale and coöperating therewith a spring detent 575, which may also be provided with a pointer 576 reading on the scale.

By way of explication, a beam may be found to be slightly longer or shorter than the nominal or specified length. This may be ascertained by the reading of the pointer 570 on the scale 540. The operator can then set the head 573 by the pointer 576 to correspond to the excess or shortage in the beam. The relation of the scale to the pitch of the thread on the shank 572 may be such that the error or variation may be distributed at each end of the beam. The face 577 may be used to contact with the face 563 on block 546.

In accordance with certain features of the invention means are provided whereby the supplying of a shape, or other work, to the machine calls the alining means into action, and if desired the supporting devices also. In accordance with one feature of the invention, the size or conformation of the supplied work controls the alining means and also, if desired, the supporting means. As hereinbefore stated, a transferring device is provided having relative movement with respect to the progressing means for transferring the work thereto, and in accordance with one feature of the invention the supply of the work to the transferring means calls said transferring means into action to deliver the work to the progressing means. Embodying these features of invention there are shown contiguous to one or more of the rails 55 a member 600 pivoted upon a sliding bar 604 conveniently mounted on the rail 55. Said member 600 is held in position at either limit of its throw by a suitable spring 601. Suitable stops 602 and 603 are shown for limiting the movement of the lever 600. The bar 604 is shown provided with teeth 605 meshing with a pinion 606. Also meshing with said pinion 606 is shown a toothed sliding bar 607. Pivoted upon the bar 607 are shown levers 608 and 609 acted on by a suitable spring 610. If desired suitable adjusting means may be provided for one of said levers, such as the screw 611. Said levers are shown connected together by the link 612. Attached to said levers is a blade 613 which is in whole or in part of conducting material. In operative relation therewith are shown contacts 614 which are in the circuit 179 and also in the circuit 236. Suitable means for restoring the bars 604 and 607 to position are provided. The form thereof herein shown comprises a pulley 615 fixed to rotate with pinion 606 and carrying a weight 616 suspended by a suitable cord. This operates to restore the bars 604 and 607 to the position shown in Fig. 5 when they are relieved.

There is also shown in the present embodiment, slidable upon one or more of the rails 55, a block 620, said block being also slidably connected to a block 621 fixed to the rail 55, the block 620 being shown with a rod 622 working in an aperture in the block 621. A spring 623 is shown coiled about the rod 622 between said blocks. A nut 624 is shown threaded upon the end of the rod 622 to limit its movement. Projecting from the block 620 is shown a pin 625, to the other end of which is attached a bridge piece 626 movable into and out of contact with pole pieces 627 in circuit 179 and also in circuit 236. A spring 628 is shown tending to press the head of the pin 625 away from the block 620.

Means are provided for locking the bridge piece 626 in its circuit closing position and for this purpose there is shown a lug 630 upon the pin 625 and in operative relation therewith a latch 631 acted on by spring 632. A suitable trip 633 is shown carried on some convenient part of the machine as for instance the support 96.

At 638 are shown pole pieces in the circuit 81 and in operative relation therewith a bridge piece 639 in the form of a lever acted on by spring 644, the tail of said lever being in the path of the swinging blade 613. On the lever 639 is shown a pin 640 and contiguous thereto a pivoted latch 641 acted on by spring 642. The bar 97 contiguous to latch 641 has pivoted to it a spring pressed dog 645 arranged to act on latch 641 on the return of rod 97 to its normal position. (See Fig. 17.)

At 650 is shown a pair of pole pieces in circuits 179 and 236. In operative relation therewith is shown a bridge piece 651 carried upon a rod 652 pivoted to levers 653 and 654. The ends of said levers are connected by a pivoted rod 655 and a spring 656 acts on lever 653 to restore them. A lever 657 is shown having a pin 658 in operative relation with the rod 652. In contact with the other end of said lever 657 is shown a sliding rod 659 working in the supporting lug 660 carried by the sliding box 151. The rod 659 is shown in contact with the face 661 on the support 150 for the alining roll 93. The support for the lever 657 is shown slidably mounted on the bar 97 and is further shown tied to the lug 660 by the rod 662.

At 665 are shown a pair of pole pieces in circuit 228 with which coöperate a bridge piece 666 which may be carried on the rod 652, suitable insulation being provided as a matter of course.

The manner of operation of the foregoing mechanism is substantially as follows:

The work $x$ as it slides down the rails 55 throws over the member 600, the rear flange engaging said member as seen in Fig. 6. The work then causes the rack bar 604 to slide downwardly until the forward flange engages the alining roll 92 as also shown in Fig. 6. The sliding bar 607 receives a corresponding movement to the right (see Figs. 5 and 6), the bridge 613 keeping the circuit at the pole pieces 614 closed during this movement. The shape in sliding downward has also engaged the buffer 620, the spring 622 serving to bring it to rest easily against the alining roll 92. The pin 625 has also been engaged by the work $x$ to connect the pole pieces 627, which are in circuits 179 and 236. The energizing of the circuits 179 and 236 throws in clutch 174 and 175 and also clutch 200—205, respectively, (see Figs. 10 and 19), causing the drums 161 to feed up the alining rolls 93 and the movable disks 265. This movement continues until the moving disk 265 contacts with the lever 608, or the contact point 611, when the circuits 179 and 236 are broken at 614, releasing the clutches 174—175 and 200—205, and bringing the alining rolls 93 and supporting disks 265 to rest. The movement of the blade 613 with the levers 608 and 609 to break the circuit at 614 serves also to break circuit 81 at 638, (see Fig. 7). The magnet 80 is thus deënergized permitting the air to escape from the cylinder 70, and allowing the rails 55 to swing downwardly about their pivots. During this movement, the work $x$ is received by the disks 265 and 266, (see Figs. 7 and 11). The rails 55 swing downwardly substantially to the dotted position shown in Fig. 5, to permit clearance for the work to move longitudinally and transversely. The work $x$ is thus left resting upon the disks 265 and 266, and ready to be positioned by the alining means, (see Fig. 11).

The bar 607 is shown held to position (see Fig. 5) by yielding means, the form thereof illustrated herewith comprising a sliding support 680 acted on by a spring 681, a nut 682 serving to properly position the supporting surface of the member 680. The rail 55 may be provided with means for engaging the bar 607 as the rail descends to swing the bar downwardly against the spring 681. The contact 611 is thus moved past the disk 265, the spring 610 acting to cause the blade 613 to move upwardly and close the circuits 179 and 236 at 614, thereby causing the alining rolls 93 to move toward the work $x$. During this movement the springs 152 are compressed between the supports 150 for the alining rolls and the box 151. The lug 660 travels forward with the box 151, but the rod 659, contacting with the face 661 on the support 150, rocks lever 657 to break the circuits 179 and 236 at 650. The rolls 93 are thus brought to rest pressing the shape firmly against the rolls 92, through the compression of springs 152, (see for instance Figs. 12 and 18). The detents 295 have traveled along the racks 294 during the feeding movement of the rolls 93, and now serve to hold the rolls 92 and 93 firmly in position relatively to each other. The movement of the rod 652, through the rocking of lever 658 just described, has closed the circuit 228 at 665, thus energizing the magnet 227 to clutch together members 201—206, thereby connecting the motor 115 to the shaft 106 from which the worms 99 and 283 are driven. The latch 685 engages the end of the rod 652 to hold it in depressed position. A suitable spring pressed latch is arranged to engage a projection on the rod 652 to hold said rod until it is desired to release it to reverse relations at the contacts 650 and 655. The latch 685 is shown connected to an arm 686, said arm connecting by a pin and slot connection with a rod 687. Said rod 687 is pivotally connected to an arm 688 arranged in the path of the work near the point where it passes on to the rails 55, (see Fig. 5.) The pin and slot connection just mentioned permits the latch 685 to snap over the projection to hold the rod 652, but when the advancing work trips the lever 688, the latch 685 is lifted clear of its projection and the bridge piece 651 connects the pole pieces 650, while the bridge piece 666 breaks the circuit 228 at the pole piece 665. The worms 99 and 283 are now actuated to move the entire series of alining rolls 92 and 93 and also the supporting disks 265 and 266 transversely, to center the work relatively to the tool-equipped means. In accordance with one feature of the invention, means are provided, controlled by the size or conformation of the work, for governing the extent of this centering movement. The form of such means shown herein comprises a slidable member 690 having a stepped face 691 and traveling in suitable guides 692. The member 690 is shown provided with teeth 693 meshing with a pinion 694 in driving relation with the pinion 606. At 695 are shown pole pieces in the circuit 228 and in operative relation therewith a pivoted bridge piece 696 in contact with a pin 697. The lever 696 may be under the impulsion of a spring 698 and a suitable spring may act also upon the pin 697. There is also provided upon the support 96 a face 699. The manner of operation of said mechanism is substantially as follows: The travel of the rack 604, as will be recalled, is dependent upon a dimension of the worm, and through the pinion 694 a corresponding or proportionate feed of the slidable member 690 is effected, (see Figs. 15 and 16). This brings one of the steps 691 into line with the pin 697 and the face 699. As the alining means travels transversely, the pin 697 rocks the pivoted bridge piece 696, breaking the circuit 228 at 695 thus releasing the clutch members 201—206. The face 699 is brought up against the positioned step of the series 691, thus bringing the work to rest accurately in position. The pinion 694 may be disconnected from driving relation with the pinion 606, thus leaving the slide 690 out of operative relation with the alining devices whenever the use of said devices may not be desired. Means are provided for holding out of operation said centering means except as it is required or may be used in connection with a new piece of work received. The form of such means shown herein comprises locking devices applied to the bridge piece 696. An arm 700 is shown fixed to a common axis with said bridge piece and carrying a pin adapted to be engaged by a spring pressed latch 701. Coacting with said latch 701 is a suitable spring pressed lever 702 in operative relation with which is a slidable spring pressed rod 703 mounted on one of the rails 55 for receiving the work. As the work is fed on, it engages and slides the pin 703, thereby causing the lever 702 to kick out the latch 701. The bridge piece 696 is then actuated by its spring 698 to break the circuit 721 and make the circuit 228. When this relation is again reversed, as already described, the latch 701 engages the lever 700, and holds it until it is again disengaged by the feeding on of the new work.

Means are included in the invention, in accordance with certain features thereof, for accurately positioning the work in accordance with a predetermined setting. As shown herein said means are applied to positioning the work transversely. Such means could be applied also to control the progressive movement and to position the work for the various operations to be performed on the work during its progression. Such means could be applied both to the transverse movements and positionings of the work and also to its movements and positionings in the direction of progression of the work. In the form of such means illustrated, there is shown a movable member preferably in the form of a rotatable arm 704. Suitable means are provided which may be arranged or set to determine the movement or travel of said arm. There is shown for this purpose a disk 705 in the face of which may be a plurality of holes 706 for receiving a pin 707 which serves as a stop for the arm 704. Said holes 706 may be arranged in various ways but are shown herein arranged transversely and also circularly with respect to said disk. Connected to rotate with the arm 704 is shown a gear 708 meshing with a pinion 709. Said pinion 709 is internally threaded and mounted on a threaded shaft 710, the pinion being restrained from travel longitudinally by abutments 711. Within the shaft 710 is shown arranged, a spring pressed rod 712. In operative relation with the end of said rod is shown a lever 713 provided with a bridge piece 714. Said bridge piece is shown slidable between the pole pieces 715 in the circuit 716. Said circuit also including the magnet 227. Said lever 713 is shown mounted on a slidable block 717 guided in suitable ways and having a yoke engaging between collars 719 on the rod 710. Said mechanism operates in substantially the following manner: The pin 707 is set in a selected hole 706 corresponding to the desired setting or position of the work. The arm 704 is then rotated until brought to position against the pin. Through the gear 708 and pinion 709, the shaft 710 has been moved and positioned in accordance with the dial setting. In the circuit 716 is provided a switch 718. When said switch is closed the shaft 106 is driven from the motor 115 to travel the alining rolls, also the supporting disks and the work x engaged thereby. Said travel continues until a suitable abutment is encountered such as a collar 269, which is fixed on a journal 267. Such contact moves the spring pressed rod 712 actuating the lever 713 to break the circuit 716, thus separating the clutch members 201—205 to bring the shaft 106 to rest. This stops the travel of the alining means and supporting devices with the work at the desired point, the end of the shaft 710 serving as a stop for accurately positioning the work. It will be understood, of course, that several such devices may be employed and upon opposite sides of the work if desired. A suitable motor reverse, manual or otherwise may be provided in such case.

In the present embodiment, as previously indicated, the progressing means, or parts thereof, engage the work, firmly hold it in position and progress therewith relatively to the tool-equipped means. In carrying out this feature of the invention, in the present embodiment, the bridge 380 is fed up against the end of the work which is resting on the supporting disks and under the control of the alining means. Furthermore, in the present embodiment the bridge 380 may be called into action or movement by the positioning of the work and there are shown herein means for effecting this immediately after the centering operation.

At 720 is shown a pair of pole pieces in the circuit 721, (see Fig. 16). Referring to the particular construction shown in said figure, it will be understood that the lower left hand pole piece is a common pole for circuit 228 and circuit 721. The bridge piece 696 serves as the circuit breaker and closer for each of said circuits at this point. It will be recollected that the circuit 228 controls the drive for the worms 99 and 283 which actuate the supporting disks 265—266 and the alining rolls 92—93, respectively. The breaking of the circuit by the movement of the bridge piece 696 brings said disks and rolls to rest. The making of the circuit 721 by said bridge piece serves to unlatch the pivoted contact pieces 739, permitting them to move under the impulsion of their springs 740 to connect the pole pieces 730 and 731, the connection for which will be described hereinafter.

Means are provided for arresting the return travel of the bridge 380 at various points corresponding in a general way to the length of the shape or other work being operated upon, as these have to do also with the forward or progressing movement of said bridge, they may be appropriately described at this point. In the form of such means shown herein a series of pole pieces 730 and 731 are located at various points along the path of travel of the bridge 380. From pole pieces 730, (shown by way of elucidation in Fig. 51 of the drawing as three in number) branches 732, 733 and 734, respectively, run to corresponding contact pieces 735, 736 and 737. Each of the poles 731 is connected to the circuit 407 for the controlling mechanism for the clutch members 342 to connect the drums 389 and 390 to the motor 348. In the circuit 407 is provided a switch 745 which may make contact with either of the contact pieces 735, 736 or 737, thus bringing either pair of the pole pieces 730 and 731 into circuit. In coöperative relation with each pair of pole pieces 730 and 731 is shown a pivoted bridge piece 739 acted on by a spring 740. Adjacent to each bridge piece is shown a pivoted latch 741 acted on by a spring 742. The tail of each latch is in operative relation with a spring pressed lever 476, provided with an armature 743 in operative relation with a magnet 744 in the circuit 721. On each lever 746 is a spring pressed dog 747 which momentarily trips the latch 741 when said lever 746 is actuated by its armature. Upon the bridge 380, there is provided a member in the form of a pivoted lever 750, acted on by a spring 751, for moving the pivoted bridge pieces 739 when traveling toward the right as shown in Figs. 22 and 51 of the drawings, but to snap past them when traveling in the opposite direction. The switch 745 may be thrown to any contact desired, dependent upon the length of the work to be received, the switch being thrown to the contact corresponding to the bridge piece 739, which is at a convenient distance beyond the end of the work. It may be supposed that the switch is on the contact 736. The intermediate pair of pole pieces 730, 731 will then be alive and the pair at either side dead. As the bridge 380 travels to the right referred to in Figs. 2 and 51, the actuator 750 will swing the first contact piece 739 about its pivot thus breaking the circuit at the corresponding pole pieces. The latch 741 will engage the pin 752 to hold the bridge piece. As this branch of the circuit is dead this has no effect upon the clutch 742. The same series of operations will then occur when the bridge 380 meets the intermediate contact piece, but as this branch of the circuit is alive, the breaking of it acts to throw out the clutch 342 in a manner which will be understood from a preceding part of the description.

As hereinbefore stated, in the present embodiment the moving up of the bridge 380, is consequent upon the centering of the work or upon the positioning of the work transversely. With the form of such mechanism just described, the pin 697 contacting with one of the stepped faces 691 makes the circuit 721 and 720, energizing the magnet 744, thus permitting each of the bridge pieces 739 to return to the circuit closing position under the impulsion of its spring 740. The pins 753 may act as stops for the bridge pieces 739.

The circuit 721 being energized in the manner indicated, the consequent movement of the released bridge piece 739, serves to close the circuit 407 at the pole pieces 730—731. This calls into action the drums 389—390 and bridge 380 travels forward. The head 480 contacts with the work, the spring 494 passing under tension at the same time, the dogs 381 and 382 traveling over their corresponding racks, said dogs having been released from their detents through the action of the mechanism previously described. The work progresses until the proper face thereof is in contact with the head 450 of the bridge 330. The circuit 407 is now broken at the pole pieces 462, through the action of the lever 461 upon the rod 459. In the present embodiment the rod 459 is not shown acting directly upon the pole pieces 462, but actuates an arm 770 on a shaft 771, having fixed thereto a second arm 772 which acts on an arm 773 on a pivoted bridge piece 774. Said bridge piece is also provided with an arm 775, the function of which will be explained hereinafter. The right bridge 380 is thus brought to rest, the dogs 381 and 382 engaging the racks 333 and 334, thereby constituting the bridges and the members 331 and 332 into a firm and rigid carriage structure. While the work is thus firmly held and positioned in the direction of its forward feed both with respect to the driving devices for the progressing means and also the distance indicating devices, the heads 450 and 480 will permit any lateral or transverse movement necessary to leave the work absolutely under the control of the alining devices. The work may now be progressed from time to time and from position to position as may be necessary to perform upon it the operations required in the precise location and position relatively to the work and to each other.

The setting of one of the forms of distance indicating devices illustrated in this embodiment has already been described. Means are provided which may be actuated under the control of the distance indicating devices to bring the work to rest in operative relation with the tool-equipped means in accurate correspondence with the setting of the distance indicating means. In the form thereof shown herein a controller or rheostat 780 is provided having a controller arm 781 located in the path of travel on the arm 560. Said controller is in a circuit 782 with the motor 348. The controller arm 781 is shown with a pivoted joint therein at 783 acted against by a suitable spring the purpose of which will be later set forth. The controller arm 781 may be moved by the operator to drive the progressing means to progress the work, and as the work progresses, the arm 560, which has been set with the distance indicating devices will act by contacting with the controller arm 781 to regulate and decrease the speed of the progressing means. The controller arm is shown with a contact surface 785 coöperating with a true surface on the arm 560, and with a contacting surface 786 coöperating with a similar surface upon a fixed stop 787. The distance indicating devices may be again set, the progressing means started by the operator, and the work will again be brought to rest by the machine in exact correspondence to the setting of the distance indicating devices.

After the operations on the work have been completed, the progressing means are brought to rest by suitable means. In the present embodiment the bridge 380 is brought to rest by being disconnected from the racks 333 and 334. This is effected in the present instance by the dogs 381 and 382 contacting with the cam shapes 515. Means are provided for also throwing out the clutch members 341 and 342, each time the work progressing means is brought to rest during the progress of the work. In the illustrated form of such means, a spring pressed pin 800 is shown, projecting from the contacting face of the stop 787 and having its other end in contact with a pivoted bridge piece 801, said bridge piece being in operative relation with a pair of pole pieces 802 in the circuit 408.

There is provided in the present embodiment supplemental means for permitting a further feed of the bridge 330 in order that it may move clear of the work prior to the feeding off thereof. After the operations on the work are completed the controller arm 781 may be swung about its pivot 783 against its spring to permit the arm 560 to pass during each further feed or forward movement of the bridge 330. As the bridge 330 progresses, the arm 560 engages a pivoted arm 805 connected by the link 806 to the pivoted bridge 801. This, it will be understood breaks the circuit 408 to throw out the clutch 341 and 342. The spring 807 acts to restore the bridge piece 801.

Means for reversing the motor 348 to feed backward the progressing means to receiving position, or to be ready for such backward feed are provided. In the illustrated form thereof the pivoted bridge piece 810 is shown in operative relation with pole pieces 811 in circuit 358. It will be recalled that this circuit serves to operate the clutch 350 to reverse the direction at the gear 345. Means are also provided for reversing the direction of drive for the drums 389 and 390, thereby permitting the independent return of the right bridge 380 if desired. In the form of such means shown herein, the arm 775 of the bridge piece 774 is arranged in the path of the arm 560 near the end of its path of travel. Said arm 560, acting through said arm 775 make the circuit 407 at the pole pieces 462. This serves to connect the clutch member 342 and 405 and thereby the motor 348 and the drums 389 and 390.

The mechanisms just described constitute a form of means for returning the bridge 380 to the receiving position. Said receiving position may be determined through suitable means, a form of which has already been described.

In the present embodiment the work is discharged from the progressing means, after which the bridge 330 and the members 331 and 332 are returned to the position in which the new work is brought into correlation with the distance indicating devices and the tool equipped means. The means for effecting said return movement will be described hereinafter.

The form of means for feeding off the work from the progressing means comprises devices for engaging the work upon the progressing means and carrying it away therefrom through the relative movement of the engaging means and the progressing means. For convenience also the alining means may be brought back to a general receiving position at this time, and this also serves to definitely position the work relative to the feeding off means so that the work may always be in approximately the same position relative to the feeding off means, when it begins to act upon the work to convey it away from the progressing means. In the present embodiment, therefore, the pivoted bridge piece 810 is shown coöperating with a pair of pole pieces 820 in the circuit 134 in which is the magnet 133. Said pole pieces are also in circuit 819 in which is the magnet 227. It will be recalled that magnet 133 controls the direction of drive of the gear 110 relatively to the motor 115, and that the magnet 227 controls the shaft 106, through the cylinder 216 and the associated mechanism hereinbefore described by operatively connecting the motor 115, through the gear 110 and clutch members 201—206 with the worms 99 and 283. This will feed or travel the sets of alining rolls 92 and 93 and also the supporting disks 265 and 266, and their associated parts, toward the rear of the machine referred to in Fig. 2 and to the left referred to in Fig. 30. Suitable means are provided for controlling or stopping this feed or travel, and the illustrated form thereof comprises a pivoted bridge piece 822 coöperating with pole pieces 823 in the circuit 819. The pivoted bridge piece 822 is shown acted on by the spring 824 impelling it to the closed position. This bridge piece 822 is acted on by one of the racks 280 to break the circuit 819 to bring the alining devices 92 and supporting disks 266 and their associated parts to rest. The racks 280 are also shown brought to rest against suitable stopping surfaces 825, (see Fig. 18) in order to accurately position the parts.

The means for carrying away the work from the progressing means, in the form illustrated herewith, comprises a series of rails 840 mounted to swing about the shaft 841. Mounted upon the rails 840 are shown sliding bars 842 working in suitable guides 843 mounted upon the rails 840. Each of said bars is shown provided with an engaging lug 874. The bars 842 are provided with a rack piece 844 meshing with a pinion 845 carried on the shaft 841. Each pinion 845 is connected to rotate with a sprocket 846. A suitable sprocket chain 847 is shown connecting each of the sprocket wheels 846 and sprocket wheels 848 fixed to the shaft 849. Fixed on the shaft 849 is shown a pinion 850 meshing with a rack 851 connected to a piston rod 852 in the cylinder 853, in which works the piston 854. Suitable valves 855 and 856 each admitting and releasing fluid under pressure from said cylinder are provided. If desired said valves may be under automatic control to cause the desired movements of the mechanism. The valve 855 is shown provided with a lever 860 having an armature 861 in operative relation with a magnet 862 in the circuit 863, provided with pole pieces 864, shown supported on a guide 892, in operative relation with which is a movable bridge piece 865, shown carried on a lever 833. Said lever is shown provided with a projection 832 which coöperates with one of the rails 840. There is shown pole pieces 880 in circuit 408 and coöperating therewith a bridge piece 881 which may be carried on lever 833. In said circuit 863 are shown also a pair of pole pieces 839 and coöperating therewith a bridge piece 838. Said bridge piece is shown mounted on a lever 837. On said lever is shown a cam face 836, while on one of the bars 840 is shown a pin 835, a pin 834 on one of said bars 842 acts on said lever 837. The valve 856 is shown provided with a lever 866 having an armature 867 in operative relation with a magnet 868 in the circuit 869. In the circuit 869 are shown a pair of pole pieces 870 in coöperative relation with which is a bridge piece 871, which for convenience is shown herein carried on the pivoted lever 837 with the bridge piece 838.

Suitable means are shown herein for swinging the rails 840 about their centers and causing them to travel to engage the work and lift it free from the alining means. In the illustrated form thereof, rods 890 are shown pivotally connected to the ends of the rails 840 and to sliding rack bars 8( which travel in guides 892. In mesh with said rack bars 891 are pinions 893 mounted upon and rotating with a shaft 894. Loosely mounted upon said shaft 894 is shown a gear 895, with which engages a rack bar 896 connected to a piston 897 which works in a cylinder 898. Said piston is moved by fluid pressure controlled by a suitable valve 899. Said valve 899 is controlled by a magnet in the circuit 900. The construction may be generally similar to the corresponding mechanism at the other end of the machine and need not be described in detail. Said cylinders may be made double acting, however, if this is found desirable, after the manner of certain other cylinders shown and described herein. In the present embodiment the actuating or raising means for said delivery rails 840 are called into action by the alining rolls 92 and 93 reaching the end of their travel prior to the conveying away of the work. Said means are shown herein as comprising pole pieces 906 in the circuit 900 and coöperating therewith a movable bridge piece 907 mounted on a spring pressed arm 908. Said bridge piece is arranged to be acted on by one of the rack bars 97, forming part of the mechanism associated with the alining rolls. There is shown on said bar 97 a pin 913 acting on a spring og 914 on said lever 908, whereby the lever is moved in one direction only by pin 913, he in snapping by in the other direction. On said lever 908 is shown a pin 915 and coöperating therewith a spring pressed latch 916. Said latch carries an armature in operative relation with a magnet 917 in circuit 918. In said circuit 918 is a set of pole pieces 909 and a bridge piece 910 coöperating therewith. The bridge piece 910 is shown mounted on a pivoted lever 911. Upon one of the sliding bars 842 suitable means are provided for actuating said lever shown herein as a pin 912, coöperating with a spring pressed dog 919 on said lever.

The manner of operation of certain of the parts just described is substantially as follows: The circuit 900 being open at 906, the circuit is dead and the rails 840 at rest as shown generally in Fig. 30. The rack 97 in its travel will contact with the lever 908 by means of pin 913 engaging it in passing and close the circuit at 906. Latch 916 now engages pin 915 to hold lever 908 in the circuit closing position. This admits the air or other fluid into the cylinder 898, moving the rack bars 896. Said rack bars act through the pinions 895 and 893 to actuate rack bars 891 to swing said rails upwardly to the position shown generally in Fig. 31.

One of the rack bars 891, or one of the parts connected therewith, is arranged to move the lever 833 to cause bridge piece 865 to close the circuit 863. This serves, through cylinder 853, to move rack bar 851 and through the associated mechanism to drive the sliding bars 842. The lugs 874 thereon engage the work and move it off from the rails 840, (see Fig. 31). It will be recollected that the upward movement of the rails serves to remove the work from the disks 265 and 266 and from the alining rolls 92 and 93. If necessary the springs 152 may yield to allow parts of the work to pass the rolls 92. When the work has been moved clear of the rails 840, the pin 834 engages the lever 837 and moves it to the left, (referred to Fig. 30 of the drawing) breaking the circuit 863 at the pole pieces 839 and making the circuit 869 at pole pieces 870. It will be recollected that these movements occur while the rails 840 are in the elevated position, as shown in Fig. 31. The breaking of the circuit 863 permits the air to escape from the rear end of cylinder 853 while closing the circuit 869 admits the air to the opposite end of said cylinder. This through the rack bar 851 and the associated mechanisms retract the bars 842 to the position corresponding substantially to that shown in Fig. 30. As the rack bars 842 are retracted, pin 912 in passing engages the spring dog 919 on the lever 911, moving said lever against its spring to momentarily close the circuit 918 at 909. This closing of said circuit energizes the magnet 917, which moves the latch 916 permitting the lever 908, under the impulsion of its spring to break the circuit 900 at 906. This permits the pressure fluid to escape from the cylinder 898, and the rails 840 swing downwardly to the position shown in Fig. 30. As the rails 840 move downwardly, one of them contacts with projection 832, the lever 833 is actuated, and breaks the circuit 863 at 864 and makes the circuit 408 at the pole pieces 880. The circuit 863 remains dead. This circuit 408 serves to throw in the clutch members 341—342 to permit movement of the bridge 330 and its connected parts in the return direction or toward the right referred to Fig. 2.

Means are provided for preventing an upward movement of any one of the rails 840 in case the bridge 330 should come to rest thereover. In the form of such means shown herein, pinions 893 and 895 are connected by a suitable pin and socket clutch 920. Fixed to the shaft 894 is shown a grooved collar 921 engaged by a yoked lever 922. The other end of said lever is pivotally connected to a rod 923, which is also pivoted to an arm 924. Said arm 924 is shown provided with a roll 925. In case one of the rails 840 is beneath the bridge, the roll 925 will contact with the plate 919, thus rocking the arm 924, and through the bell crank lever 922 disengaging clutch 920. The pinion 893 is thus disconnected from the pinion 895 but remains in mesh with the rack bar 891. When the bridge 330 passes out of contact the spring 926 acts to restore the parts and to again connect the pinions 893 and 895.

Suitable means may be provided, if desired, for receiving the work from the rails 840 and conveying it away. Said means may be of any suitable or convenient form, so far as concerns many features of the invention, and the form shown herein comprises rails 930 upon which the work may slide. For the purpose of propelling the work there is also shown a series of sprocket chains 931 carried on suitable sprocket wheels 932 and provided with means for engaging the work, such as lugs 933.

Means are provided by the invention in one of its aspects, for returning the bridge 330 into position to begin a new progressing movement in proper correlation with the distance indicating devices and the driving, and starting and stopping means. Said movements of the bridge may begin, if desired, as soon as the rails 840 are clear of the path of travel of the bridge. In the present embodiment there is shown in the circuit 408, which serves to control certain movements of the clutch members 341 and 342, pole pieces 880 and in coöperative relation therewith a bridge piece 881 which may be in the form of a pivoted lever 833. When the rails 840 are at rest in the downward position, one of them serves to close the circuit 408 at 880. In said circuit 408 is shown also a pair of pole pieces 943 and coöperating therewith a bridge piece 944 shown herein carried on the pivoted lever 945. Adjacent to said lever 945 is shown a pivoted lever 946 carrying a pivoted pawl 947 acted on by a spring 948 to yieldingly hold it to the stop 949. Connected to the lever 946 is shown a rod 950 pivoted to bridge piece 810.

The manner of operation of the parts just described is substantially as follows: As the arm 560 reaches or approaches the end of its travel it engages the bridge piece 810, thus actuating the link 950, thereby positioning the pawl 947 against the face on the adjacent arm of the lever 945, said circuit having been closed by the action of the pin 459, which, it will be recalled, is moved by the work being brought to position against the contacting head 450 of the bridge 330. As the arm 560 engages the lever 805, as already described, the circuit 408 is broken at 802, thus disconnecting the worm clutch 341—342. As the discharging rails 840 move to remove the work from the progressing means, the circuit 408 is broken at 880 insuring that no movement of the bridge 330 shall occur until the rails 840 have again returned out of the path of the bridge. At the end of their return movement, one of the rails 840 closes the circuit 408 at 880, and the arm 560 may be moved back to permit the circuit to close at 802. The motor 348 will have been previously reversed through the circuit 358. The bridge now begins its return movement and comes in contact with the arm 946, swinging said arm, which through the pawl 947 acting on the lever 945, breaks the circuit 408 at 943, thus bringing the bridge 330 to rest. The actuation of the arm 946 serves through the link 950 to actuate bridge piece 810 to break the circuit 358 at 811, thus reversing the direction of drive of the motor 348, so that it is now ready to drive in the forward direction. The circuit 134 is also broken by the same means at 820 thus reversing the direction of drive of the motor 115 for the alining devices.

Suitable stops or adjustments 980 may be provided with which the ends of the members 331 and 332 may contact if desired. These stops are shown in the form of threaded studs provided with lock nuts and may be used to bring the bridge 330 and its confacing head for the work 450 and the distance determining devices as well into nice alinement or correlation with the tool equipped means.

Means are provided in accordance with one feature of the invention for returning the alining rolls 92 and the disks 265, to what may be termed their initial position. The form of such means shown herein includes a circuit 984, in which are included magnets for operating clutches 174, 175 and 200, 205, which actuate and also control the direction of drives of the shaft 162 upon which are the drums 161. Said circuit includes the pole pieces 864 and the circuit is made by the actuation of the bridge piece lever 823. In said circuit is also shown pole pieces 985 and coöperating therewith a bridge piece 986, carried on a pivoted spring pressed lever 987. Said lever is arranged in the path of one of the disks 265, thus breaking the circuit and bringing the drum 161, and the rolls 93 and the disks 265 to rest.

Suitable means are provided herein for governing the means for connecting and disconnecting the series of alining rolls 92 and the series 93. For this purpose there is shown herein a pivoted spring pressed detent 988 which engages a pin or lug 989 on the pivoted lever 301. (See Fig. 14.) When said lever is actuated by the right bridge the detent engages a pin 989, but upon the return of the left bridge, it engages the face 990 of the detent lever, thus releasing the lever 301, which is then returned under the impulsion of its spring 991.

Suitable means are provided for controlling the circuit 45 which governs the movement of the conveyer 8, and in the illustrated form thereof it is manually controlled. A switch 992 is provided in said circuit, same being manually operable. Means are also provided for preventing the supply of work except when the rails 55 are in receiving position. The form thereof herein shown comprises pole pieces 993 in said circuit 45 and in operative relation therewith a bridge piece carried on a pivoted lever 994. Said lever 994 is spring held out of contact with its pole pieces, but is mounted to be moved into contact therewith by one of the slides 58. It will thus be seen that the closing of the hand switch 992 serves to energize the circuit only when the rails 55 are in the work receiving position.

Various forms of tool equipped means for operating upon the work may be provided so far as concerns many features of the invention. In the present embodiment, said means are shown in the form of mechanisms equipped with punching means, shown by way of illustration operating upon an I-beam. The tool-equipped means is in definite relation to the space indicating devices so as to bring the work into relation thereto corresponding to a given setting of said devices. The alining means may also be brought into absolute relation therewith. The form of such means herein is supported and positioned in a suitable manner, the illustrated form comprising a housing 1000.

In accordance with certain features of the invention means are provided for bringing interchangeably into operative relation with the machine different tools, and in the present embodiment means are provided for maintaining a plurality of punching blocks so that any one of them may be quickly and accurately brought into operative relation with the punching mechanism. This will be found useful in many ways, especially where it is desired at successive punchings to dispose the holes in different relations or at different distances apart or to otherwise vary them. In the present embodiment a series of punch blocks 1002 are shown slidable in a suitable manner upon ways, said punch blocks being shown herein as having a shoulder or angled bearing 1005, 1006, on the edges of the track in order to keep them in alinement. At the place of operation upon the work means are provided to permit movement of the particular punching block 1002 which is in operative position with respect to the work to move to and from the work. Accordingly, a form of such means is shown wherein a section 1003, 1004, of the track 999 is carried upon suitable arms 1007 fixed to a shaft 1008. Fixed also to the shaft 1008 is shown an arm 1009, and connected to said arm is also shown a toggle 1010. A suitable link 1011 is connected to said toggle and also to a pivoted lever 1012. The free end of said lever is in operative relation with a suitable cam 1013 rotatably carried by a shaft 1014. Similarly also the track 1003 may be carried on arms 1015 fixed to a shaft 1016. Fixed also to said shaft is shown an arm 1017 operatively connected to a toggle 1018 connecting by a link 1019 to a pivoted lever 1020. Said lever may be in operative relation to a suitable cam 1021 carried by said shaft 1014. It will be understood that through the movement of said parts any one of the blocks 1002 which is in proper position may be swung downwardly by the movement of the supporting arms 1007 and 1015 and back again to position, when the blocks may be run along their tracks and any other desired block brought to the operative position.

Suitable means for maintaining the blocks 1002 absolutely in position as the supporting arms 1007, 1015 swing downwardly are provided by one feature of the invention. The illustrated form of such means comprises guide members 1052 pivotally mounted upon the respective track supporting arms 1007, 1015. Each of said alining members is pivotally connected by a rod 1053 to a suitable fixed point 1024 on the machine frame. The alining members 1022, when the arms 1007 and 1015 have their section of track in operative relation to the punch block track, are out of the way to permit the running to and fro of the blocks. As the arms 1007 and 1015 swing downwardly, said members 1022 are moved inwardly to engage the punch block at either side to hold it in exact alinement. The face of the members 1022 is shaped to so act upon the punch block during its entire downward and return movement, except that as the punch block is brought back into line with the tracks, the member 1022 is retracted so as to permit free movement of the blocks. The members 1022 are also shown constructed to, each engage the pin 1207 during the movement of the arms 1007 and 1015 so as to positively aline the punch block in the other direction. Said members may for this purpose be provided with a shaped part for receiving a pin 1207, as shown at 1025. Suitable means are provided for actuating the punch block which is in operative position, and in the illustrated form of such means comprise a reciprocating gate or block 1030 sliding in guides 1031 and 1032 supported by the housing 1000. The gate 1030 is shown pivotally connected to a link 1033 connected to an eccentric 1034 carried upon a shaft 1035 mounted in the housing 1000.

Means are provided for bringing the gate 1030 or other embodied form of actuating means, into operative relation with the positioned punch block 1002 or to prevent its passing into such operative relation under the control of the operator or through the functions and movements of other portions of the machine, or the movements of the work. In the illustrated form thereof there are comprised movable interponents or gags 1040, 1041. These are shown carried upon pivoted levers 1042 and 1043 shown herein pivotally mounted on the gate 1030 at 1044 and 1045, respectively. Pivotally connected to said levers 1042 and 1043 are shown toggles 1046. Suitable actuating means therefor are provided, the illustrated form comprising springs 1047. A suitable buffer for the gags may be provided and there is shown herein springs 1048 which act as such buffers as the gags swing into position. Additional alining means acting between the gags and the punch block may be provided if desired. A form of such means is shown as points 1039 on the gags which may fit into suitable recesses in the punch blocks. Linked to said toggles 1046 are shown slides 1049.

Means are provided for actuating and controlling the punch gags 1040, 1041 and in the form of such means shown herein, mechanism is provided for permitting or preventing the spring 1047 from moving the gags into operative position relatively to the gate and the punch block. In the present embodiment said mechanism is under the direct control of the operator. The slides 1049 are shown working in guides 1050 and connected to their toggles by rods 1051 which, if desired, may be adjustable. In operative relation with the slides 1049 are shown pivoted levers 1052, pivotally connected by a rod 1053 to a bell crank lever 1054 which is also connected to the hand lever 1055 by the rod 1056. A suitable spring 1057 is shown acting on said lever. It will be understood that by moving the lever 1055 the levers 1052 will press downwardly upon the slides 1049, thus breaking the toggles 1046 and permitting the spring 1047 to throw in the gags 1040, 1041.

Means are also provided in the present embodiment, as already indicated, for preventing the punching or other operation upon the work, and the embodied form of such means acts to hold the gags out from between the gate and the punching block. Said means in the embodied form thereof comprise a shaft 1058 connected by a suitable gear train 1059 to the motor 1089. A clutch 1060 serves to connect the gear train and the shaft 1058. A lever 1061 is shown connected by the rod 1062 to the lever 1063 and acted upon by a spring 1064 to throw in and out the clutch 1060. Rotating with the shaft 1058 is a cam 1065. In operative relation with said cam is shown an arm 1066 connected by a link 1067 with the lever 1068. Said lever communicates by a shaft 1071 with a corresponding arm 1070 upon the other side of the housing and gate. Said lever acts upon the slide 1049 by a suitable connection, such as a lug or pin 1069 to retract the slide, thus withdrawing the gags 1040 and 1041 and making the toggles 1046.

Means may be provided in one aspect of the invention for holding the interponents or gags firmly in the engaging or operative position. Such means are provided in the present embodiment and in the illustrated form thereof latches 1080 pivoted on levers 1043 and having each a pin 1081 working in a slot 1082 in the corresponding slide 1049. Said latches are provided with a shoulder 1083 which may engage with a pin or lug 1084 upon the lever 1042. A similar arrangement may be provided upon the opposite side, if desired.

Suitable driving connections are provided which may be of any convenient form so far as concerns many features of the invention. In the illustrated form of such means there is shown at 1085 a suitable clutch mechanism. Connected to said clutch mechanism is shown a gear 1086 in mesh with a pinion 1087, connected by suitable gears 1088 to the motor 1089. The clutch mechanism 1085 is shown herein operatively connected to a lever 1090 to which is connected a rod 1091.

Connected to said rod 1091 is shown a hand lever 1092 and also a pedal 1093. A suitable spring 1094 is also shown acting on the clutch lever 1090. Means are shown herein for positively separating the members of the clutch 1085 and for bringing the shaft 1035 to rest accurately in position. In the form thereof shown herein a lug or pin 1095 is shown on the slidable clutch member which is splined to the shaft 1035. In the path of said lug or pin 1095 as it rotates in the engaging position is provided a cam shape 1096 for camming it into the disengaging position. A suitable stop 1097 is shown against which the lug 1095 comes to rest and by reason of its connection therewith the shaft 1035 is also positively positioned. Clearance is allowed between the cam 1096 and the stop 1097 to permit the movement of the clutch member back again into the engaging position as shown in Fig. 50.

Suitable die handling means are provided by the invention in one of its aspects, and according to one feature of the invention the die blocks, or a series of die blocks may be provided corresponding to the punch blocks used. In the illustrated form of such means, a track 1100 is provided upon which die blocks 1101 are movably supported. In the present embodiment the die blocks are shown movable to and from the punching position. There is also shown a slidable gate or carrier 1102 for carrying the positioned die block to and fro and for supporting it firmly in the punching position. Said gate may have its surface forming a continuation of the track 1100. Any selected die block may then be supported upon and moved by the gate to the punching position and then returned into position to be run off on the track 1100. Said gate 1102 is mounted to slide in guides 1103, and is connected with suitable actuating means. The form of such means herein shown comprises levers 1104 connected to the gate 1102 by links 1105. Said levers 1104 are shown pivotally supported at 1106. Each of said levers is in operative relation with a cam 1107 carried on the shaft 1014.

Suitable means for firmly alining and holding in position the die blocks upon the gate are provided and in the illustrated form thereof there are shown carried upon the gate 1102 alining bolts 1112 shown herein working in suitable recesses 1113 in the die block 1101. Engaging each of the bolts 1112 is shown a lever 1114 pivoted upon the gate 1102 and acted on by a spring 1115. Suitable contacts may be provided for acting on the lever, and a stop 1116 is shown for throwing out the lever against its spring when the gate is in alinement with the track 1100.

Suitable means for backing and supporting the gate at the operative position are also provided and the illustrated form thereof comprises a slidable interponent or gag 1120 which may be firmly mounted upon a base or frame. Suitable actuating means therefor are provided and the illustrated form thereof comprises connecting rods 1121, connected to the gag and to the crank arms 1122 on the shaft 1123. Fixed to rotate with the shaft 1123 is shown a pinion 1124. In operative relation therewith is shown a gear wheel 1125 fixed to rotate with shaft 1014. Said wheel 1125 is shown provided with an interrupted gear, and a suitable interruption or face may be provided on the gear 1124 for the purpose of effecting the locking movement between the two, such a part being shown at 1126.

Suitable means are provided for controlling the movements of the die block and its associated mechanisms. And according to one feature of the invention, means are provided for controlling said movements in harmony with the movements of the work progressing means, and also in accordance with one feature of the invention in harmony with the movements of the punch blocks. In the form of such means shown herein, there is included a disk or carrier 1135 fixed relatively to the shaft 1014. Pivotally mounted on said disk is shown a lever 1136 connected by a link 1137 to a toggle 1138. Connected to said toggle are shown engaging bolts 1139 and 1140 sliding in suitable guides upon the carrier 1135. A suitable spring 1141 is shown acting upon the lever 1136. In contiguous relation to the carrier 1135 is shown a disk 1145 which is rotated from any suitable source of power. Upon said disk is provided a plurality of engaging members, shown herein as lugs 1146. Said disk moves free of the engaging bolts 1139 and 1140 when they are in the retracted position, but when said bolts are in the projected position they are in the path of the lugs 1146 of the rotating disk.

Suitable means are provided for controlling the movements of the engaging bolts 1139 and 1140 so as to rotate or bring to rest the shaft 1014 at the proper time. A slidable bolt 1147 is shown which may be acted on by a suitable spring 1148, serving to impel it into the path of the arm 1136. In operative relation therewith is shown a pivoted arm 1149, to which is connected the piston rod 1150 of the cylinder 1151. The end of the arm 1149 is provided with a spring latch 1152, so that said arm may serve to draw back and swing past the bolt 1147 and to snap past it when moving in the opposite direction. A suitable valve mechanism is provided for the cylinder 1151 which may be under control of a magnet 1153 in the circuit 1154. In said circuit is shown a set of pole pieces 1155 in operative relation with the pivoted bridge piece 801 (see Fig. 51). Said circuit is also shown provided with pole pieces 1156 coöperating with the bridge piece 810, to prevent actuation of the tool-equipped means during the final movement of the bridge 330. A mechanism which may be substantially similar to that just described is also shown, the bolt being indicated by the reference numeral 1160, the arm as 1161 and the cylinder as 1162, the valve controlling magnet being indicated by 1163. These mechanisms may, if desired, be substantially similar to those shown in Fig. 40 of the drawings and need not be described in fuller detail. The magnet 1163 is shown in the circuit 1164 provided with pole pieces 1165. Said pole pieces are shown in the form of brushes coöperating with a bridge piece 1166 rotatably carried on the shaft 1058.

Means may be provided if desired, for preventing any rebound or backward movement of the shaft 1108 and the parts connected therewith, and there is shown in the present embodiment a spring pressed pawl 1167 coacting with teeth 1168 upon the carrier 1135. Said pawl is shown acted on by a spring 1169. It will thus be seen that the arm 1136 and the pawl 1167 serve to firmly and accurately hold the mechanisms in position.

The mechanisms just described operate substantially as follows: When the work is brought to rest in position to be operated upon by the tool-equipped means, the bridge piece 801 is actuated in a manner already described to energize the magnet 1153. This serves to withdraw the bolt 1147 permitting the lever 1136 to move under the impulsion of its spring 1141, thus permitting said lever to escape the bolt 1147 and to actuate the toggle 1138 to project the engaging bolts 1139 and 1140. These are then taken up by the lugs 1146 on the rotating disk 1135 causing the shaft to rotate, this raising the gate 1102 with a die block 1101 positioned and secured thereon, and also to drive in the gag 1120 beneath the gate. The arm 1126 in its travel engages the bolt 1160 and is then moved against the spring, thereby retracting the engaging bolts 1139 and 1140 and disconnecting the shaft 1014 from the driving disk 1145. The parts are brought to rest in accurate position by the arm 1136 and the detent 1167 in the manner already described. This mechanism may be under the control of the operator or under the control of the mechanism, or both. With this in view there is shown in the present embodiment in the circuit 1154 a switch 1158. It will be understood that when the switch is closed the mechanism will act to position the blocks through the closure of said circuit at 1155, or the operator may call the mechanism into action by closing the switch at any time after the circuit is closed at 1155. If the pole pieces 1155 are left out of the circuit it can then be entirely under the control of the operator at the switch.

In accordance with one aspect of the invention means are provided to prevent the work being progressed until the tool has been withdrawn clear of the work. In the present embodiment there are provided in the circuit 408 pole pieces 1180. In coöperative relation with said pole pieces is shown a bridge piece 1181 fixed to rotate with the shaft 1014. Said bridge piece is arranged to close the circuit 408 at 1180 only when the shaft 1014 is in a point in its rotation which corresponds to the withdrawn position of the blocks or other tool. The invention in one of its features provides that said restoring or withdrawing action of said punch block shall not take place until after the withdrawal of the gags for the punch blocks from their operative position. In the embodied form of such means a bridge piece 1166, which is in operative relation with pole pieces 1165 in circuit 1164, is shown fixed to rotate with the shaft 1058 which controls the throw out movements of the gags 1040, 1041 as hereinbefore described. As the bridge piece 1166 contacts with said pole pieces 1165, the circuit 1164 is energized, and through the magnet 1163, of the cylinder 1162 withdraws the bolt 1160 to release the arm 1136. The bridge piece 1166 is located so as to close the circuit 1164 only at a time when shaft 1058 has operated to throw out the gags by making the toggles 1046. The closing of circuit 1164, as will be understood, causes shaft 1014 to rotate in substantially the manner already described, which operates the connected mechanisms to withdraw the gag 1120 and to let down the gate 1102, thus restoring the die block 1101 to its place in the series, and by the means hereinbefore described to also restore the punch block into alinement with its track.

Means for preventing the retraction of the gags 1040 and 1041 until the punching block gate 1030 is retracted are provided by the invention in one of its aspects, and also for preventing the gags being thrown in between the gate and the punch block, until the punch block and the die block are in punching position. In the embodied form of such means, respectively, a lug 1180 is shown fixed on the rod 1091 and a lug 1181 on the rod 1062. It will be seen therefore, that when rod 1091 is in position to throw in the clutch 1085, through actuation of the hand lever 1092 or pedal 1093, the lug 1180 will be in the path of the lug 1181 and prevent the actuation of the hand lever 1063 to throw in the clutch 1060 which acts to throw out the gags 1040 and 1041 as hereinbefore described.

The embodied form of means for preventing the throwing in of the gags 1040 and 1041 comprises a pivoted locking lever 1182 which may be conveniently connected to the locking lever 1170 by a pivoted link 1183. It will thus be seen that the pedal 1093 and the hand lever 1092 are either locked or released practically simultaneously with the lever 1055 so as to insure a proper relation and timing between the punching block and its gate and the gags coöperating therewith.

Means are provided whereby the punch block is prevented from performing the punching operation until the die block is in proper position and supported by its supporting means. In the form of such means shown herein a suitable lock lever 1170 is provided movable into and out of locking position relatively to the hand lever 1092 and the pedal 1093. Said lever is shown in operative relation with a cam 1173 on the shaft 1014. Said parts are so constructed and arranged that the lever 1170 moves to the unlocking position only when the die block and its associated parts are in the operative or punching position.

The invention in one of its aspects provides means for uniting the punch blocks into a series, while freely permitting the selected block to move out of the series while operating upon the work and to return to position in the series after the operation is completed. In the embodied form of such means there is shown in one end of the block 1002 a T shaped groove 1200 extending therethrough. The end of the adjacent punch block is shown provided with a T shaped member 1201 projecting therefrom, the transverse portion 1202 of which may, if desired, be of cylindrical or rounded form. The ends of the groove 1200 may, if desired, be beveled or rounded substantially as shown in Fig. 42 of the drawings. By such an arrangement the blocks will pass readily into and out of engagement with each other and will also permit of freedom of movement on the axis of the portion 1202.

Suitable propelling means for the punch blocks may be provided and the illustrated form thereof includes sprocket chains 1203. Said sprocket chains are shown working over sprocket wheels 1204 and 1205. Means are provided thereon for engaging the blocks in the train, and the illustrated form of such means comprises recessed lugs 1206 which may engage pins 1207 upon the punch blocks.

The train of die-blocks is moved in harmony with the train of punch blocks, to bring any pair of blocks simultaneously to position. In the present embodiment there is shown a form of means for effecting this comprising pins 1230 on the die-blocks, engaging suitable sprocket chains 1231, which may be generally similar to those for the punch blocks. Said chains are shown carried by sprocket wheels 1232, 1233. Fixed to rotate with the sprocket wheel 1232 is a sprocket wheel 1234, which may be driven by a sprocket chain 1235 from the shaft 1213. It will be understood that in practice the sprocket chains, or other driving means, will operate to bring any pair of blocks to the operative position, but are shown slightly to one side in the present drawings for the sake of clearness.

Suitable means for driving the propelling mechanism in either direction are provided and in the illustrated form thereof there is shown a sprocket wheel 1212 fixed on the shaft 1213 with which the sprocket wheel 1204 has also driving connections. Said sprocket wheel 1212 carries a sprocket chain 1214 working also over a sprocket wheel 1215. Fixed to rotate with said sprocket wheel 1215 is shown a beveled pinion 1216. Meshing with said beveled pinion 1216 are shown beveled gears 1217 and 1218 free to rotate with a suitable driven shaft 1219. Said gears may be loose on their shaft and a suitable clutching member 1220 may be provided for connecting either of the gears to the shaft 1219. Said mechanism may be similar to other mechanisms already described and need not be set forth in detail at this point. Said clutch member 1220 is shown connected to a piston rod 1221, the piston of which works in a cylinder 1222. A suitable spring 1223 may be used to hold the clutch in engaging position with one of the pinions, the fluid pressure in the cylinder being utilized to move into engagement with the other gear. The valve mechanism of said cylinder may be controlled in any suitable manner either manually or otherwise. It is shown herein controlled by a magnet 1224 in a circuit 1225 provided with a switch 1226.

Means are provided by the invention for selecting and positioning any desired pair of punch and die-blocks and in accordance with one feature of the invention said means are power driven but are set by the operator for the selection and positioning of the blocks. In the embodied form of such means there is shown fixed to the shaft 1213 a pinion 1240, meshing with a gear 1241, fast on a shaft 1242. Contiguous thereto is shown a disk 1243 having in its face a groove 1244, preferably of circular form, and may consist of a series of substantially concentric, communicating grooves. There is also shown in the face of said disk a series of holes 1245 for receiving a stop pin 1246. Said gear 1241 is connected to move in a definite relation with the driving mechanism for the trains of punch and die blocks. The holes 1245 are also in definite relation to the travel of the blocks, so that any punch block and its corresponding die block may be traveled and positioned in operative relation to the actuating means. Fixed to the shaft 1242 is shown an arm 1247 arranged for rotation over the faces of the disk. Means are provided for causing the arm to coöperate with, and to be stopped by, the pin 1246 as set by the operator. The embodied form of such means comprises a block 1248 movable radially with respect to the arm 1247, its movement being controlled by the cam groove 1244. Said block 1248 is shown mounted to slide on a guide piece 1249 fixed to the arm 1247. The block 1248 is also shown having a pin 1250 working in the cam groove 1244. Slidably mounted upon the block 1248 is shown a block 1251, slotted to receive the guides 1252 which support and guide said block 1251 on the block 1248. Said block 1251 is shown with depending flanges 1253 extending downwardly at either side. Mounted on the block 1251 is shown a bridge piece 1254. Fixed to rotate with the shaft 1242 is shown an arm 1255 consisting of two parts 1256 and 1257, electrically insulated from each other. Said parts constitute pole pieces in the circuit 1258, the brush 1259 serving to connect the member 1257 with one of the wires of said circuit.

Suitable devices for throwing off the power from the drive for the punch and die blocks are provided, in accordance with one feature of the invention, coöperating with the means just described. The electrical connections just described, it will be understood, constitute a part of said power controlling devices. In the illustrated form of such devices there is further shown a driven shaft 1270 which may be connected to, or disconnected from the shaft 1219 by a suitable clutch 1271, which may be of the general form shown in Fig. 48 of the drawings. It will not be necessary to describe said mechanism in detail. The clutch release may be operated by a suitable fluid pressure, such a cylinder being shown at 1272. The valve mechanism thereof may be controlled by a suitable magnet 1273 in the circuit 1258. Said circuit is shown also provided with a switch 1274.

The clutch 1271 is shown consisting of two members, a disk 1280 fixed to rotate with the shaft 1270 and a disk 1281 fixed to rotate with the shaft 1219. Said disk 1280 is provided with one or more engaging lugs 1282. On the disk 1281 is shown one or more bolts 1284 which may be moved out of or into engaging position with respect to the lugs 1282 upon the opposed disk 1280. Said bolts are shown herein as two in numbers connected to a toggle 1285. Said toggle is connected by a suitable link to a pivoted arm 1286 carried upon said disk 1281. A spring 1287 acts upon the arm 1286 to cause it to move the bolts into engaging position. Mounted in the path of the arm 1286 is shown a slidable latch 1290 acted on by a suitable spring 1291. Connected to the piston 1292 of the cylinder 1272 is shown a pivoted arm 1293. Said arm is arranged to engage a lug on the latch 1290 when the arm is moved by the action of the pressure fluid in the cylinder 1272, and to hold the latch 1290 out of the path of the arm 1286 until the pressure fluid is released and the piston is moved in the opposite direction. When such movement of the piston occurs the arm 1293 moves backwardly allowing the spring 1291 to move the latch 1290 into the path of the arm 1286. This arm is then moved against the spring to retract its bolts 1284 out of the path of the bolts 1282, thus disconnecting the shaft 1219 from its drive. A suitable detent 1294 may be provided to prevent any rebound or backward movement of the disk 1281 and shaft 1219. It will be noted that this mechanism does not act to merely escape or throw in the shaft 1219 for a definite portion of a revolution, or for any number of revolutions, but serves to drive the shaft for any desired number of revolutions, or parts thereof, but bring the mechanism to rest always in some predetermined relation. Thus the train of blocks may be run for any desired distance along their track, but it will be always brought to rest with a die block and its corresponding punch block in operative relation with their actuating mechanisms.

The manner of operation of the mechanisms just described is substantially as follows: The pin 1246 is placed in the hole in the disk 1245 corresponding to the selected punch and die blocks. The direction of travel of the arm 1247, and of the trains of blocks is controlled through the switch 1226, which controls the direction of drive at the clutch 1220. The switch 1274 is then closed, throwing in the shaft 1219 with the driven shaft 1270. As the arm 1247 rotates, the block 1248 will move inwardly or outwardly following the groove 1244. The block 1251 will finally collide with the pin 1246, and will slide in the guides 1252, thus moving the bridge piece out of contact with either of the poles 1256 or 1257. This serves to break the circuit 1258, which through magnet 1273 and cylinder 1272 throws out the clutch 1271. The shaft 1213 is thus brought to a dead stop by the pin 1246, the power being also thrown off at the same time. The springs 1275 serve to restore the block 1251, and the pole piece 1254 to position when the arm 1247 is out of contact with its pin 1246.

Suitable means are provided for firmly holding the work during the withdrawal of the tool therefrom. The form of such means illustrated herein is suitable for operation by means of fluid pressure, and is shown as comprising a cylinder 1300 having a piston rod 1301 connected to an arm 1302. Said arm is shown fixed to a shaft 1303 mounted in bearings 1304. Fixed on said shaft are shown arms 1305 and fixed in the ends of said arms is shown a rod 1306 extending across the path of the work. Suitable springs 1307 are between said arms and a support on the frame. A suitable valve 1308 for admitting and releasing the fluid pressure from said cylinder is shown. Means are provided for controlling the operations of the mechanism to cause the rod 1306 to bear upon the work during the withdrawal of the tool and to move away during the progression of the work. In the illustrated form a rod 1309 connects the valve 1308 with an arm 1310; said arm is shown connected by a spring 1319 to a lever 1320, the arm resting against the stop 1321. Said lever 1320 through the pivoted rod 1311 connects to a lever 1312. Said lever is in operative relation with a cam 1313 upon the shaft 1014. A suitable spring 1314 may be employed to hold the lever to the cam. Such a mechanism may be employed on either side of the tool and is so shown in the drawings. Means are provided for holding said mechanism out of operation in case one of the bridges is positioned therebeneath. In the form thereof herein shown a lug 1315 is fixed on the valve rod 1309. In coöperative relation therewith is shown a lever 1316 suitably supported in the frame. On the bridge 330 is shown a cam plate 1317 and on the bridge 380 is shown a cam plate 1318. Either of these plates serves to position the lever 1316 to prevent the throwing of the valve. Thus either rod 1306 may be held up out of operative position in case either of the bridges are in the way. It will be understood that with this arrangement the lever 1320 may be mounted on a shaft 1322 which has fixed thereto a similar lever or arm connected in a similar manner to the other valve rod and its arm.

Means may be provided, in accordance with one feature of the invention, for allowing for deformations or irregularities of the work transversely of the direction of progression of the work toward the tool equipped means, so that the alinement may always be accurate at the point of operation upon the work. In the present embodiment certain of the alining rolls 92 and their associated parts may be constructed so as to yield, should this be required, in keeping the work absolutely in alinement at the tool. Said rolls are shown rotatably mounted on a slidable block 1325, and are held to a fixed abutment 1326 on rod 97 by a stiff spring 1327. Said spring may work against a suitable collar 1328 which may be adjustable on the rod 97. The relative strength of the springs 152 and 1327 will be such that the roll 92 will maintain its proper position during the alining operation. It will be understood also that two or more of the sets of pole pieces 627 may be in series at different points along the work, each set having a suitable bridge piece or contact 626 and associated mechanisms. This will serve to call into action the succeeding functions of the machine only after the work has moved within the range of the alining means.

The member 600 is restored to position by suitable means such as the contact piece 1330.

The operation of the various mechanisms and of the machine as an entirety will be clearly understood from the foregoing description. A brief statement will be now given of the operation of some of the principal parts of the mechanisms constituting the present embodiment.

The work may be supplied to conveyer 1 in any suitable manner, and is conveyed thereby substantially to the position shown in dotted lines in Fig. 5. If the rails 55 are in the work receiving position as shown in Fig. 5, the closing of the switch 993 will actuate the intervening mechanism to withdraw the latch 25 to escape the disk 19 to actuate the conveyer 8. The work is progressed onto the rail 55, as shown in Fig. 5 and slides down thereon by gravity. The rail raising mechanism may be actuated by the making of the circuit 81 through either pair of pole pieces 727, 730. Member 600 is engaged by the work $x$ during its movement and serves through the described mechanism to bring the alining rolls 93 and disks 265 to approximate position relatively to the size of the work. The work $x$ serves to rest against the block 620 as shown in Fig. 6, and the rails 55 are caused to swing downwardly. As they do so the work is transferred to the disks 265 and 266, in position between the sets of alining rolls 92 and 93 as shown in Fig. 7. The alining rolls 93 are now moved into close contact with the work, the springs 152 passing under tension to position the work between the rolls (see Figs. 11 and 12). The two sets of alining rolls are now firmly connected together as shown in Fig. 13. The work is now centered relatively to the tool equipped means. For this purpose the slide 690 has been brought to a position corresponding to the axis of the work. The engagement of the alining rolls 93 with the work, starts this positioning movement, which is terminated by the slide 690 and the mechanisms connected therewith. The right bridge 380 is now called into action and brings the head 480 to bear against the work, the spring 494 passing under tension. The work is brought into contact with the head 480 on the bridge 330, and the work is firmly held under pressure between said heads, as shown in Fig. 4ª. The dogs of the right bridge have engaged the racks of the connecting members 331, 332, thereby constituting a firm and substantial carriage for positioning and progressing the work. The pointer 570 at this time indicates the exact length of the work on the scale 540. The distance indicating means are now set to the desired reading and the progressing means is brought into operation through the starting box 780. The desired set of punch and die blocks are brought to position as shown in Figs. 36 and 37. The work is brought to rest through the action of the arm 560 as hereinbefore described. The shaft 1014 has been actuated to bring the blocks into position against the work as shown in Fig. 39. The lever 1055 is actuated to throw in the gags 1040, 1041 and the tool is brought into operation. The gags are now retracted, the gate 1030 having moved away, the punch block is withdrawn and the die block retracted. The rods 1306 have been caused to press down upon the work and hold it firmly to position during the withdrawal of the punches or other tools. The progressing, punching and allied operations are repeated as often as desired and until the operations are completed. After the operations on the work are completed the left bridge 330 is given an additional travel, as hereinbefore described, to provide clearance during the feeding off of the work. The right bridge having been released from the members 331, 332, is traveled back until brought to rest in a suitable position as determined by the mechanisms shown in Fig. 51. The rails 840 are then actuated to lift the work from the supporting disks and from between the alining rolls, the actuating mechanisms therefor having been called into action by the arm 560 during the final movement of the left bridge. The racks 842 are then actuated to lift the work, through the engagement therewith of the lugs 847, and the work is progressed to, and is then conveyed away by the sprocket chains 931. The racks 842 are retracted the rails 840 are dropped, and the front bridge is returned to its initial position as shown in Fig. 2.

It will be understood that while certain features of the invention are directed toward making certain operations and functions of the machine dependent upon the performance or completion of some other operation or function, that so far as concerns other features of the invention, such functions and operations or any of them might be under the direct control of the operator.

While the present embodiment is shown provided with tool equipped means for piercing the work, and while certain aspects of the invention have especially in view the piercing of holes in the work, it will be understood that in other aspects of the invention it is applicable to and has in view the performance of other operations upon the work, and the handling and positioning of the work for other kinds of operations. It will be obvious that many features of the invention may be employed with tool equipped means of different kinds as, by way of example, devices for cutting, shearing, forming or impressing the work.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I claim as my invention and desire to secure by Letters Patent, is:

1. A machine for operating upon structural shapes including in combination means for piercing the shape, means for alining the shape relatively to said piercing means, means for progressing and locating the shape relatively to said piercing means, and means for supplying a shape to said progressing means.

2. A machine for operating upon structural shapes including in combination, means for piercing the shape, means for alining a shape relatively to said piercing means, means for supplying a shape to the alining means, and operating means for the alining means, controlled by said supplying means.

3. A machine for operating upon structural shapes including in combination means for piercing the shape, means for alining the shape relatively to said piercing means, means for supplying a shape to the alining means, and means controlled by the supplied shape for controlling the alining means.

4. A machine for operating upon structural shapes including in combination means for piercing the shape, means for alining a shape relatively to said piercing means, and means for supplying a shape to the alining means, said supplying means comprising a part wherein the shape is mechanically moved, and another part wherein it is moved by gravity.

5. A machine for operating upon structural shapes including in combination means for piercing the shape, means for supplying a shape to the machine, means for engaging a supplied shape and progressing it toward the piercing means, and means for controlling said engaging and progressing means, said controlling means being operated by the supplied shape.

6. A machine for operating upon structural shapes including in combination means for piercing the shape, traveling means for progressing a shape relatively to said piercing means, and means called into action by said progressing means reaching a predetermined point in its travel for supplying a shape to said progressing means.

7. A machine for operating upon structural shapes including in combination means for piercing the shape, means for progressing a shape relatively to said piercing means, means for controlling the movement of said progressing means to properly locate successive pierced openings in the shape, and means for removing the shape from the progressing means after the piercing is completed.

8. A machine for operating upon structural shapes including in combination means for piercing the shape, means for progressing a shape relatively to said piercing means, means for controlling the movement of the progressing means to properly locate successive pierced openings in the shape, and means called into action by the completion of the piercing operations for removing the shape from the machine.

9. A machine for operating upon structural shapes including in combination means for piercing the shape, means for progressing the work relatively to said piercing means, said progressing means traveling between receiving and delivering positions, means called into action by the progressing means reaching the receiving position for supplying a shape to the progressing means, and means called into action by the progressing means reaching the delivering position for taking the shape from the progressing means.

10. A machine for operating upon structural shapes including in combination means for piercing the shape, means for progressing the shape relatively to said piercing means, said progressing means being substantially horizontally arranged, means for positioning the shape above said progressing means, and means for moving the progressing and positioning means relatively to each other to transfer the shape from the positioning means to the progressing means.

11. A machine for operating upon structural shapes including in combination means for piercing the shape, means for progressing the shape relatively to said piercing means, said progressing means being substantially horizontally arranged, means for positioning the shape above said progressing means, means for moving the progressing and positioning means relatively to each other to transfer the shape from the positioning means to the progressing means, and alining means for alining the shape upon the progressing means relatively to said piercing means.

12. A machine for operating upon structural shapes including in combination means for piercing a shape, a carriage for progressing a shape relatively thereto, a swinging, inclined frame above said carriage, means for causing the frame to swing downwardly past the carriage to deposit the shape thereon, and means actuated by a shape sliding down said inclined frame for controlling said causing means.

13. A machine for operating upon structural shapes including in combination means for piercing the shape, means for progressing a shape relatively to said piercing means, means for supplying a shape to the progressing means, and means for positioning the shape relatively to the progressing means while it is still carried by the supplying means.

14. A machine for operating upon structural shapes including in combination means for piercing the shape, means for progressing the shape relatively thereto, and means for supplying a shape to the progressing means, said supplying means including a shape supporting member movable transversely of the progressing means to deliver the shape to said progressing means.

15. A machine for operating upon structural shapes including in combination means for piercing the shape, means for progressing the shape relatively thereto, means for supplying a shape to the progressing means, said supplying means including a shape supporting member movable transversely of the progressing means to deliver the shape to said progressing means, and means actuated by the shape supported upon said frame for controlling the movement of said shape supporting member.

16. A machine for operating upon structural shapes including in combination means for piercing the shape, means for progressing a shape relatively thereto, means for supplying a shape to the progressing means, said supplying means including a shape supporting member movable transversely of the progressing means to deliver the shape to said progressing means, and means called into action by the transfer of the shape from said supporting member to said progressing means for causing said progressing means to firmly engage said shape.

17. A machine for operating upon structural shapes including in combination means for piercing a shape, means for progressing a shape relatively thereto, means for alining the shape upon the progressing means relatively to said piercing means, means for supplying a shape to the progressing means, and means for causing the alining means to operate upon the shape, said causing means being called into operation by the supplying of the shape to the progressing means.

18. A machine for operating upon structural shapes including in combination, means for operating upon the shape, means for engaging and progressing a relatively long and rigid shape, relatively to said operating means, means arranged at one side of said operating means for supporting at a plurality of points said long and rigid shape during its progression, and means for adjusting said supporting means transversely of the shape to support shapes of different widths.

19. A machine for operating upon structural shapes including in combination means for operating upon the shape, means for progressing the shape relatively to said operating means, means for supporting the shape during its progression, means for bringing said supporting means into supporting position relatively to the shape, and means operated by the shape for controlling said last mentioned means.

20. A machine for operating upon structural shapes including in combination means for operating upon the shape, means for progressing the shape relatively to said operating means including some members traveling with the shape and other members with which the shape has rolling contact during its progression.

21. A machine for operating upon structural shapes including in combination means for operating upon the shape, means for progressing the shape along a path past said operating means including rotatable supporting devices arranged along the path of the shape to support the shape, and means acting to bring all said devices into position to support the shape.

22. A machine for operating upon structural shapes including in combination means for operating upon the shape, means for progressing the shape along the path past said operating means including rotatable supporting devices arranged along the path of the shape to support the shape, and means governed by the size of the shape supplied to the progressing means for bringing said supporting devices into position to support the shape.

23. A machine for operating upon structural shapes including in combination means for operating upon a shape, means for progressing the shape relatively to the operating means including devices for supporting the shape while it is in operative relation with the progressing means, means for supplying a shape to the progressing means, and means controlled by the shape while it is operated on by the supplying means for positioning the supporting devices to support the shape.

24. A machine for operating upon structural shapes including in combination means for operating upon the shape, means for progressing the shape along a path past said operating means, and means for alining the shape upon the progressing means, said alining means being controlled by the size of a shape supplied to the progressing means.

25. A machine for operating upon structural shapes including in combination means for operating upon the shape, means for progressing the shape along a path past said operating means, means for alining the shape upon the progressing means, means for supplying a shape to the progressing means, and means controlled by the shape upon the supplying means for governing the alining means.

26. A machine for operating upon structural shapes including in combination means for operating upon the shape, means for progressing the shape along a path past said operating means, means for supporting the shape at a plurality of points, and opposed alining devices located at various points away from said operating means, one of said devices being placed under tension when engaged by the shape.

27. A machine for operating upon structural shapes including in combination means for operating upon the shape, means for progressing the shape along a path past said operating means, means for supporting the shape at a plurality of points, a plurality of opposed alining devices arranged at various points along said path, one of said opposed devices passing under tension when engaged by the shape.

28. A machine for operating upon structural shapes including in combination means for operating upon the shape, means for progressing the shape along a path past said operating means, supporting means for the shape, means for alining the shape located at one side of said operating means, means for positioning the supporting means relatively to the alined shape and means for stopping the alined shape in a plurality of positions to be operated upon by said operating means.

29. A machine for operating upon structural shapes including in combination means for operating upon the shape, traveling means for progressing the shape relatively to the operating means, said progressing means comprising a head and devices for pressing the end of the shape against said head, and also comprising members in rolling contact with said shape.

30. A machine for operating upon structural shapes including in combination means for operating upon the shape, means for progressing the shape relatively to the operating means, said progressing means comprising a head, and means brought into action by the supplying of a beam to the progressing means for pressing the end of the shape against said head.

31. A machine for operating upon structural shapes including in combination means for operating upon the shape, means for progressing the shape relatively to the operating means, said progressing means comprising a head, a contact piece carried by said head and adjustable relatively thereto, and means for pressing the shape against said contact piece.

32. A machine for operating upon structural shapes including in combination means for operating upon the shape, means for progressing the shape relatively to the operating means, said progressing means comprising a head, a second head, connections between the two heads, means for connecting and disconnecting said second head from said connections, and means for moving said second head to place a shape under pressure between said heads.

33. A machine for operating upon structural shapes including in combination means for operating upon the shape, means for progressing the shape relatively to the operating means, said progressing means comprising a head, a second head, connections between the two heads, means for connecting and disconnecting said second head from said connections, means for supplying a shape between said heads, and means called into action by the supply of a shape for moving said second head to press the shape between the two heads.

34. A machine for operating upon structural shapes including in combination means for operating upon the shape, means for progressing the shape relatively to the operating means, said progressing means comprising two heads relatively movable with respect to each other to press the shape therebetween, connections between said heads, means for connecting and disconnecting one of said heads from said connections, and supporting means in rolling contact with the shape as it is progressed by the progressing means.

35. A machine for operating upon structural shapes including in combination means for operating upon the shape, means for progressing the shape relatively to the operating means, said progressing means comprising two heads relatively movable with respect to each other to press the shape therebetween, connections between said heads, means for connecting and disconnecting one of said heads from said connections, supporting means in rolling contact with the shape as it is progressed by the progressing means, and a plurality of alining devices arranged along the path of travel of the progressing means.

36. A machine for operating upon structural shapes including in combination means for operating upon the shape, means for progressing the shape relatively to the operating means, said progressing means comprising a head, and means for pressing the shape against said head, and measuring means in definite relation to said head.

37. A machine for operating upon structural shapes including in combination means for operating upon the shape, means for progressing the shape relatively to the operating means, means for indicating the position and distance from the end of the shape of a particular operation, and means for indicating the distance between the points of successive operations.

38. A machine for operating upon structural shapes including in combination means for operating upon the shape, means for progressing the shape relatively thereto, distance determining means settable by the operator, and means controlled by the distance determining means for bringing the progressing means to rest after it has progressed the distance for which the distance determining means was set relatively to the operating means.

39. A machine for operating upon structural shapes including in combination means for operating upon the shape, means for progressing the shape relatively to the operating means, said progressing means comprising a head, means for positioning the shape relatively thereto, and means which may be set relatively to said head to bring the shape to position to be operated upon by said operating means.

40. A machine for operating upon structural shapes including in combination means for operating upon the shape means for pressing the shape relatively to the operating means, said progressing means comprising a head, and means for positioning the shape relatively thereto, and distance indicating means in fixed relation with said head, and means which may be set relatively to said distance indicating means and acting upon the progressing means to position the shape relatively to the operating means.

41. A machine for operating upon structural shapes including in combination means for operating upon the shape, a head movable relatively to said operating means, means for positioning the shape relatively to the head, a scale fixed with respect to said head, and means for stopping said head which may be set relatively to said scale.

42. A machine for operating upon structural shapes including in combination means for operating upon the shape, a head movable relatively to said operating means, means for positioning the shape relatively to said head, a scale fixed with respect to said head, a second scale movable with respect to the first scale, and means fixed with respect to said second scale for stopping said movable head.

43. A metal working machine including in combination a train of punch blocks, a train of corresponding die blocks, means independent of said die blocks for presenting the work therebetween, and means for progressing said train of blocks.

44. A metal working machine including in combination a train of punch blocks, a train of corresponding die blocks, means independent of said die blocks for presenting the work therebetween, means for progressing said trains of blocks, and means which may be set to bring any desired pair of the punch and die blocks into position to operate upon the work.

45. A metal working machine including in combination a train of punch blocks, a train of corresponding die blocks, means for presenting the work therebetween, means for progressing said trains of blocks, and means which may be set to bring any desired pair of the punch and die blocks into position to operate upon the work, said settable means operating through said progressing means.

46. A metal working machine including in combination a train of punch blocks, means for presenting the work thereto, means for progressing the train of blocks to bring a desired block into operative position with respect to the work, means for moving the block transversely to said direction of progression when punching the work, and connections between the blocks of the train whereby said block performs said transverse movement and then returns into its place in the train without disturbing the other blocks of the train.

47. A metal working machine including in combination a train of tool-equipped blocks, means for presenting the work thereto, means for progressing the train of blocks to bring a desired block into operative position with respect to the work, means for moving the block transversely to said direction of progression when operating upon the work, and connections between the blocks of the train whereby said block performs said transverse movement and then returns into its place in the train without disturbing the other blocks of the train.

48. A metal working machine including in combination a train of punch blocks, connections between the blocks of the train whereby they are progressed together in one direction and whereby any selected block may be progressed alone in a different direction.

49. A metal working machine including in combination a train of punch blocks, connections between the blocks of the train whereby they are progressed together in one direction and whereby any selected block may be progressed alone in a different direction, but will resume its place and relation to the other blocks of the train when moved back into alinement therewith.

50. A metal working machine including in combination means for holding the work, means for moving a tool-equipped block into and out of operative position with respect to the work, moving operating means for the tool-equipped block, and an interponent movable into and out of position to render said operating means operative with respect to the tool-equipped block.

51. A metal working machine including in combination a train of punch blocks, a train of corresponding die blocks, means for progressing said trains of blocks together, and means which may be set in advance to arrest said progressing movement with any pair of blocks in position to operate upon the work, and means for supporting the work in operative relation with said blocks.

52. A metal working machine including in combination means for supporting the work, a punch block movable into and out of operative position relatively to its actuating means, actuating means for the punch block comprising a reciprocating gate, an interponent movable into position between the gate and punch block to cause the gate to operate the block and means for registering the block and interponent with respect to each other.

53. A metal working machine including in combination means for supporting the work, a punch block movable into and out of operative position relatively to its actuating means, actuating means mounted independently of the punch block for engaging the punch block and causing it to operate upon the work and means for registering the punch block and said operating means with respect to each other.

54. A metal working machine including in combination means for supporting the work, a track upon which a series of tool equipped blocks are movable to and fro, means for moving a section of the track with a block thereon toward the work, and means acting to hold the block in position upon said section of the track.

55. A metal working machine including in combination means for supporting the work, a track upon which a series of tool-equipped blocks are movable to and fro, means for moving a section of the track with a block thereon toward the work, means acting to hold the block in position upon said section of the track and so that it will resume its relation in the train of blocks upon the section of track returning to its place in the track.

56. A metal working machine including in combination a work progressing carriage, said carriage being provided with work positioning means, a scale fixed relatively to the work positioning means, a scale movable along and relatively to said scale and devices whereby one scale may be read upon the other.

57. A metal working machine including in combination a work progressing carriage, said carriage being provided with work positioning means, a scale fixed relatively to the work positioning means, a scale movable along and relatively to said scale, devices whereby one scale may be read upon the other, and means for holding said movable scale in any desired position relatively to the other scale.

58. A metal working machine including in combination tool equipped means, a work progressing carriage, said carriage being provided with work positioning means, a scale fixed relatively to the work positioning means, a scale movable along and relatively to said scale, devices whereby one scale may be read upon the other, means for holding said movable scale in any desired position relatively to the other scale, and means settable in connection with said scales for arresting the work progressing carriage with the work in a position relatively to the tool equipped means corresponding to the setting of the scales.

59. A machine for operating upon structural shapes including in combination, a plurality of rotatable supports arranged in a line, tool equipped means located in operative relation with said line of supports, a carriage for firmly engaging said shape while permitting it to rest upon said rotatable supports, means for progressing said carriage and shape with the shape in rolling contact with said rotatable supports, and settable means for positioning said shape relatively to said tool equipped means to be operated upon by said means.

60. A machine for operating upon structural shapes including in combination, a plurality of non-traveling but rotatable supports arranged in a line, tool equipped means located in operative relation with said line of supports, a carriage for firmly engaging said shape while permitting it to rest upon said rotatable supports, means for progressing said carriage and shape with the shape in rolling contact with said rotatable supports, and settable means for positioning said shape relatively to said tool equipped means to be operated upon by said means.

61. A machine for operating upon structural shapes including in combination, a plurality of rotatable supports arranged in a line and adapted to support the shape, at a plurality of points along its length, tool equipped means in operative relation with said line of supports, means for positioning a shape transversely with reference to said tool equipped means while supported upon said supports, means for progressing the shape relatively to said tool equipped means and along said rotatable supports while in rolling contact therewith, and means for stopping said shape in a predetermined position with respect to said tool equipped means to be operated upon by said means.

62. A machine for operating upon structural shapes including in combination, a plurality of non-traveling but rotatable supports arranged in a line and adapted to support the shape, at a plurality of points along its length, tool equipped means in operative relation with said line of supports, means for positioning a shape transversely with reference to said tool equipped means while supported upon said supports, means for progressing the shape relatively to said tool equipped means, and along said rotatable supports while in rolling contact therewith, and means for stopping said shape in a predetermined position with respect to said tool equipped means to be operated upon by said means.

63. A machine for operating upon structural shapes including in combination, a plurality of rotatable supports arranged in a line and adapted to support the shape at a plurality of points along its length, means for conveying a shape to and depositing it upon a plurality of said supports, tool equipped means in operative relation with said line of supports, means for positioning a shape transversely with reference to said tool equipped means while supported upon said supports, means for progressing the shape relatively to said tool equipped means and along said rotatable supports while in rolling contact therewith, and means for stopping said shape in a predetermined position with respect to said tool equipped means to be operated upon by said means.

64. A machine for operating upon structural shapes including in combination, a plurality of rotatable supports arranged in a line and adapted to support the shape at a plurality of points along its length, tool equipped means in operative relation with said line of supports, means for positioning a shape transversely with reference to said tool equipped means while supported upon said supports, means for engaging said shape after it is so deposited and for progressing said shape relatively to said tool equipped means and along said rotatable supports while in rolling contact therewith, and means for stopping said shape in a predetermined position with respect to said tool equipped means to be operated upon by said means.

65. A machine for operating upon structural shapes including in combination, a plurality of non-traveling but rotatable supports arranged in a line and adapted to support the shape at a plurality of points along its length, means for conveying a shape to and depositing it upon a plurality of said supports, tool equipped means in operative relation with said line of supports, means for positioning a shape transversely with reference to said tool equipped means while supported upon said supports, means for progressing the shape relatively to said tool equipped means and along said rotatable supports while in rolling contact therewith, and means for stopping said shape in a predetermined position with respect to said tool equipped means to be operated upon by said means.

66. A machine for operating upon structural shapes including in combination, a plurality of non-traveling but rotatable supports arranged in a line and adapted to support the shape at a plurality of points along its length, tool equipped means in operative relation with said line of supports, means for positioning a shape transversely with reference to said tool equipped means while supported upon said supports, means for engaging said shape after it is so deposited and for progressing said shape relatively to said tool equipped means and along said rotatable supports while in rolling contact therewith, and means for stopping said shape in a predetermined position with respect to said tool equipped means to be operated upon by said means.

67. A machine for operating upon structural shapes including in combination, a plurality of rotatable supports arranged in a line and adapted to support the shape at a plurality of points along its length, tool equipped means in operative relation with said line of supports, means for positioning a shape transversely with reference to said tool equipped means while supported upon said supports, means engaging said shape at both ends for progressing the shape relatively to said tool equipped means and along said rotatable supports while in rolling contact therewith, and means for stopping said shape in a predetermined position with respect to said tool equipped means to be operated upon by said means.

68. A machine for operating upon structural shapes including in combination, a plurality of rotatable supports arranged in a line and adapted to support the shape at a plurality of points along its length, tool equipped means in operative relation with said line of supports, means for progressing the shape relatively to said tool equipped means and along said rotatable supports while in rolling contact therewith, a head in definite relation to said progressing means against which said shape is pressed, and means for stopping said shape in a predetermined position with respect to said tool equipped means to be operated upon by said means.

69. A machine for operating upon structural shapes including in combination, a plurality of rotatable supports arranged in a line and adapted to support the shape at a plurality of points along its length, means for depositing a shape upon said supports, tool equipped means in operative relation with said line of supports, means for engaging said shape after it is so deposited and for progressing said shape relatively to said tool equipped means and along said rotatable supports while in rolling contact therewith, and means for stopping said shape in a predetermined position with respect to said tool equipped means to be operated upon by said means.

70. A machine for operating upon structural shapes including in combination a plurality of non-traveling but rotatable supports arranged in a line and adapted to support the shape at a plurality of points along its length, means for depositing a shape upon said supports, tool equipped means in operative relation with said line of supports, means for engaging said shape after it is so deposited and for progressing said shape relatively to said tool equipped means and along said rotatable supports while in rolling contact therewith, and means for stopping said shape in a predetermined position with respect to said tool equipped means to be operated upon by said means.

71. A machine for operating upon structural shapes including in combination a plurality of rotatable supports arranged in a line and adapted to support the shape at a plurality of points along its length, tool equipped means in operative relation with said line of supports, means for progressing the shape relatively to said tool equipped means and along said rotatable supports while in rolling contact therewith, a head in definite relation to said progressing means against which said shape is pressed, and means for stopping said shape in a predetermined position with respect to said tool equipped means to be operated upon by said means.

72. A machine for operating upon structural shapes including in combination a plurality of rotatable supports arranged in a line and adapted to support shapes of different lengths at a plurality of points along its length, tool equipped means in operative relation with said line of supports, means adjustable to shapes of different length for progressing the shapes relatively to said tool equipped means and along said rotatable supports while in rolling contact therewith, a head in definite relation to said progressing means against which said shape is pressed, and means for stopping said shape in a predetermined position with respect to said tool equipped means to be operated upon by said means.

73. A machine for operating upon structural shapes including in combination a plurality of rotatable supports arranged in a line and adapted to support shapes of different lengths at a plurality of points along its length, tool equipped means in operative relation with said line of supports, means for progressing the shapes relatively to said tool equipped means and along said rotatable supports while in rolling contact therewith, a head in definite relation to said progressing means but movable transversely to the direction of progression of said shape, against which shape said head is pressed, and means for stopping said shapes in a predetermined position with respect to said tool equipped means to be operated upon by said means.

74. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, a head against which said shape is pressed as it progresses, and means for stopping said traveling devices of the progressing means at a plurality of selected and predetermined points relatively to said tool operated means to permit the tool equipped means to operate upon the shape at such points, said stopping means being in definite relation to said head.

75. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, a head against which said shape is pressed as it progresses, driving means for said progressing means, settable distance indicating devices in definite relation to said head, means controlling the action of said driving means upon said progressing means, and means for causing said controlling means to bring the shape to rest relatively to the tool operated means at the distance which said distance indicating devices are set.

76. A machine for operating upon structural shapes including in combination tool equipped means for operating upon a shape, progressing means for the shape including devices traveling along a substantially horizontal path between a receiving and a delivery position while holding the shape in fixed relation therewith and non-traveling devices upon which said shape rests and with which it has rolling contact as it progresses, a head against which said shape is pressed as it progresses, settable distance indicating devices in definite relation to said head, and means for bringing said shape to rest relatively to the tool equipped means at a point corresponding to the setting of said distance indicating means.

77. A machine for operating upon structural shapes including in combination tool equipped means for operating upon a shape, progressing means for the shape including devices traveling along a substantially horizontal path between a receiving and a delivery position while holding the shape in fixed relation therewith and non-traveling devices upon which said shape rests and with which it has rolling contact as it progresses, settable distance indicating devices in definite relation to said head, and means for bringing said traveling devices of said progressing means and said shape held thereby to rest relatively to said tool equipped means while the shape rests upon said non-traveling devices at the point to which said distance indicating means was set.

78. A machine for operating upon structural shapes including in combination tool equipped means for operating upon a shape, progressing means for the shape including devices traveling along a substantially horizontal path between a receiving and delivery position while holding the shape in fixed relation therewith, and non-traveling devices upon which said shape rests and with which it has rolling contact as it progresses, means for stopping said traveling devices of the progressing means at a plurality of selected and predetermined points relatively to said tool operated means to permit the tool equipped means to operate upon the shape at such points, and means for automatically delivering a shape to said progressing means when at the receiving position.

79. A machine for operating upon structural shapes including in combination tool equipped means for operating upon a shape, progressing means for the shape including devices traveling along a substantially horizontal path between a receiving and a delivery position while holding the shape in fixed relation therewith and non-traveling devices upon which said shape rests and with which it has rolling contact as it progresses, means for stopping said traveling devices of the progressing means at a plurality of selected and predetermined points relatively to said tool operated means to permit the tool equipped means to operate upon the shape at such points, and means for automatically removing the shape from said progressing means at the delivery position.

80. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, driving means for said progressing means, settable distance indicating means, means controlling the action of said driving means upon said progressing means, means for causing said controlling means to bring the shape to rest relatively to the tool operated means at the distance which said distance indicating devices are set, and means for automatically delivering a shape to said progressing means when at the receiving position.

81. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, driving means for said progressing means, settable distance indicating devices, means controlling the action of said driving means upon said progressing means, means for causing said controlling means to bring the shape to rest relatively to the tool operated means at the distance which said distance indicating devices are set, and means for automatically removing the shape from said progressing means at the delivery position.

82. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, means for stopping said traveling devices of the progressing means at a plurality of selected and predetermined points relatively to said tool equipped means to permit the tool equipped means to operate upon the shape at such points, and means for delivering a shape to said progressing means when at the receiving position whereby it rests upon said non-traveling devices and in position to have its ends engaged by said traveling devices.

83. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, means for stopping said traveling devices of the progressing means at a plurality of selected and predetermined points relatively to said tool operated means to permit the tool equipped means to operate upon the shape at such points, and means for causing said traveling devices of said progressing means to release said shape at the delivery position, and means for conveying away the shape.

84. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, settable distance indicating devices, means for bringing said traveling devices of said progressing means and said shape held thereby to rest relatively to said tool equipped means while the shape rests upon said non-traveling devices at the point to which said distance indicating means was set, and means for delivering a shape to said progressing means when at the receiving position whereby it rests upon said non-traveling devices and in position to have its ends engaged by said traveling devices.

85. A machine for operating upon structural shapes including in combination tool equipped means for operating upon a shape, progressing means for the shape including devices traveling along a substantially horizontal path between a receiving and a delivery position while holding the shape in fixed relation therewith, and non-traveling devices upon which said shape rests and with which it has rolling contact as it progresses, settable distance indicating devices, means for bringing said traveling devices of said progressing means and said shape held thereby to rest relatively to said tool-equipped means while the shape rests upon said non-traveling devices at the point to which said distance indicating means was set, means for causing said traveling devices of said progressing means to release said shape at the delivery position, and means for conveying away the shape.

86. A machine for operating upon structural shapes including in combination a plurality of supports arranged in a line for supporting the shape at a plurality of points along its length as it is progressed, tool-equipped means arranged along said line of supports, progressing means for progressing the shape along said line of supports and relatively to said tool-equipped means, a head against which the shape is pressed, and means for stopping the shape in predetermined position relatively to the tool equipped means to permit the tool to operate upon the shape at a predetermined point, said stopping means being in definite relation to said head.

87. A machine for operating upon structural shapes including in combination a plurality of fixed supports arranged in a line for supporting the shape at a plurality of points along its length as it is progressed, tool-equipped means arranged along said line of supports, progressing means for progressing the shape along said line of supports and relatively to said tool equipped means, means for stopping the shape in predetermined position relatively to the tool-equipped means to permit the tool to operate upon the shape at a predetermined point, and a head in definite relation to said shape against which said shape is pressed.

88. A machine for operating upon structural shapes including in combination a plurality of supports arranged in a line for supporting the shape at a plurality of points along its length as it is progressed, tool equipped means arranged along said line of supports, said plurality of supports being automatically adjustable transversely of the length of the shape to accommodate shapes of different widths, progressing means engaging the ends of the shape for progressing it along said line of supports and relatively to said tool-equipped means, and means for stopping the shape in predetermined position relatively to the tool-equipped means to permit the tool to operate upon the shape at a predetermined point.

89. A machine for operating upon structural shapes including in combination a plurality of supports arranged in a line for supporting the shape at a plurality of points along its length as it is progressed, tool equipped means arranged along said line of supports, alining devices arranged at various points along the path of the shape to the tool equipped means for alining said supported shape transversely with reference to the tool equipped means, progressing means engaging the ends of the shape for progressing it along said line of supports and relatively to said tool equipped means, and means for stopping the shape in predetermined position relatively to the tool equipped means to permit the tool to operate upon the shape at a predetermined point.

90. A machine for operating upon structural shapes including in combination a plurality of supports arranged in a line for supporting the shape at a plurality of points along its length as it is progressed, tool equipped means arranged along said line of supports, alining devices arranged at various points along the path of the shape to the tool equipped means for alining said supported shape transversely with reference to the tool equipped means, said alining means being transversely adjustable to aline shapes of different widths, progressing means engaging the ends of the shape for progressing it along said line of supports and relatively to said tool equipped means, and means for stopping the shape in predetermined position relatively to the tool equipped means to permit the tool to operate upon the shape at a predetermined point.

91. A machine for operating upon structural shapes including in combination a plurality of supports arranged in a line for supporting the shape at a plurality of points along its length as it is progressed, tool equipped means arranged along said line of supports, a plurality of alining devices arranged along said line of supports for alining said supported shape with respect to said tool equipped means, progressing means engaging the ends of the shape for progressing it along said line of supports and relatively to said tool equipped means, and means for stopping the shape in predetermined position relatively to the tool equipped means to permit the tool to operate upon the shape at a predetermined point.

92. A machine for operating upon structural shapes including in combination a plurality of supports arranged in a line for supporting the shape at a plurality of points along its length as it is progressed, tool equipped means arranged along said line of supports, a plurality of alining devices arranged along said line of supports for alining said supported shape with respect to said tool equipped means, said alining means being transversely adjustable to aline shapes of different widths, progressing means engaging the ends of the shape for progressing it along said line of supports and relatively to said tool equipped means, and means for stopping the shape in predetermined position relatively to the tool equipped means to permit the tool to operate upon the shape at a predetermined point.

93. A machine for operating upon structural shapes including in combination a plurality of rotatable supports arranged in a line for supporting the shape at a plurality of points along its length as it is progressed, tool equipped means arranged along said line of supports, progressing means for progressing the shape along said line of supports and relatively to said tool equipped means, means for stopping the shape in predetermined position relatively to the tool equipped means to permit the tool to operate upon the shape at a predetermined point, and a head in definite relation to said stopping and positioning means against which the end of said shape is pressed.

94. A machine for operating upon structural shapes including in combination a plurality of rotatable supports arranged in a line for supporting the shape at a plurality of points along its length as it is progressed, tool equipped means arranged along said line of supports, said plurality of supports being adjustable transversely of the length of the shape to accommodate shapes of different widths, progressing means pressing against the ends of the shape for progressing it along said line of supports and relatively to said tool equipped means, and means for stopping the shape in predetermined position relatively to the tool equipped means to permit the tool to operate upon the shape at a predetermined point.

95. A machine for operating upon structural shapes including in combination a plurality of rotatable supports arranged in a line for supporting the shape at a plurality of points along its length as it is progressed, tool equipped means arranged along said line of supports, means for alining said supported shape transversely with reference to the tool equipped means, progressing means pressing against the ends of the shape for progressing it along said line of supports and relatively to said tool equipped means, and means for stopping the shape in predetermined position relatively to the tool equipped means to permit the tool to operate upon the shape at a predetermined point.

96. A machine for operating upon structural shapes including in combination a plurality of supports arranged in a line for supporting the shape at a plurality of points along its length as it is progressed, tool equipped means arranged along said line of supports, progressing means engaging the shape for progressing it along said line of supports and relatively to said tool equipped means, settable means for transversely positioning said shape while engaged by said progressing means, and means for stopping the shape in predetermined position relatively to the tool equipped means to permit the tool to operate upon the shape at a predetermined point, said stopping means including devices settable in advance to cause said stopping means to act at the desired point.

97. A machine for operating upon structural shapes including in combination a plurality of rotatable supports arranged in a line for supporting the shape at a plurality of points along its length as it is progressed, tool equipped means arranged along said line of supports, progressing means engaging the shape for progressing it along said line of supports and relatively to said tool equipped means, settable means for transversely positioning said shape while engaged by said progressing means, and means for stopping the shape in predetermined position relatively to the tool equipped means to permit the tool to operate upon the shape at a predetermined point, said stopping means including devices settable in advance to cause said stopping means to act at the desired point.

98. A machine for operating upon structural shapes including in combination a plurality of supports arranged in a line for supporting the shape at a plurality of points along its length as it is progressed, tool equipped means arranged along said line of supports, said plurality of supports being adjustable transversely of the length of the shape to accommodate shapes of different widths, progressing means engaging the shape for progressing it along said line of supports and relatively to said tool equipped means, settable means for transversely positioning said shape while engaged by said progressing means, and means for stopping the shape in predetermined position relatively to the tool equipped means to permit the tool to operate upon the shape at a predetermined point, said stopping means including devices settable in advance to cause said stopping means to act at the desired point.

99. A machine for operating upon structural shapes including in combination a plurality of rotatable supports arranged in a line for supporting the shape at a plurality of points along its length as it is progressed, tool equipped means arranged along said line of supports, said plurality of supports being adjustable transversely of the length of the shape to accommodate shapes of different widths, progressing means engaging the shape for progressing it along said line of supports and relatively to said tool equipped means, settable means for transversely positioning said shape while engaged by said progressing means. and means for stopping the shape in predetermined position relatively to the tool equipped means to permit the tool to operate upon the shape at a predetermined point, said stopping means including devices settable in advance to cause said stopping means to act at the desired point.

100. A machine for operating upon structural shapes including in combination a plurality of rotatable supports arranged in a line for supporting the shape at a plurality of points along its length as it is progressed, tool equipped means arranged along said line of supports, means for alining said supported shape transversely with reference to the tool equipped means, progressing means engaging the shape for progressing it along said line of supports and relatively to said tool equipped means, settable means for transversely positioning said shape while engaged by said progressing means, means for stopping the shape in predetermined position relatively to the tool equipped means to permit the tool to operate upon the shape at a predetermined point, said stopping means including devices settable in advance to cause said stopping means to act at the desired point and a head in definite relation to said settable stopping means, against which head the shape is pressed.

101. A machine for operating upon structural shapes including in combination a plurality of supports arranged in a line for supporting the shape at a plurality of points along its length as it is progressed, tool equipped means arranged along said line of supports, said plurality of supports being automatically adjustable transversely of the length of the shape to accommodate shapes of different widths, progressing means engaging the shape for progressing it along said line of supports and relatively to said tool equipped means, settable means for transversely positioning said shape while engaged by said progressing means, and means in definite relation to an end of the progressed shape for stopping the shape in predetermined position relatively to the tool equipped means to permit the tool to operate upon the shape at a predetermined point.

102. A machine for operating upon structural shapes including in combination a plurality of supports arranged in a line for supporting the shape at a plurality of points along its length as it is progressed, tool-equipped means arranged along said line of supports, said plurality of supports being adjustable transversely of the length of the shape to accommodate shapes of different widths, devices engaging a shape prior to its being deposited upon said supports for automatically positioning said supports to accommodate the width of said shape, progressing means engaging the ends of the shape for progressing it along said line of supports and relatively to said tool equipped means, and means for stopping the shape in predetermined position relatively to the tool equipped means to permit the tool to operate upon the shape at a predetermined point.

103. A machine for operating upon structural shapes including in combination a plurality of supports arranged in a line for supporting the shape at a plurality of points along its length as it is progressed, tool-equipped means arranged along said line of supports, said plurality of supports being adjustable transversely of the length of the shape to accommodate shapes of different widths, devices engaging a shape prior to its being deposited upon said supports for automatically positioning said supports to accommodate the width of said shape, progressing means engaging the ends of the shape for progressing it along said line of supports and relatively to said tool equipped means, and means for stopping the shape in predetermined position relatively to the tool equipped means to permit the tool to operate upon the shape at a predetermined point, said stopping means including devices settable in advance to cause said stopping means to act at the desired point.

104. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and means for disconnecting one of said bridges from said side rails and moving it to permit the supplying to and delivery from said work progressing carriage of the shape.

105. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and a plurality of stationary supports arranged along said way for supporting said shape as it is progressed by said carriage.

106. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and a plurality of pairs of stationary supports arranged along said way for supporting said shape as it is progressed by said carriage, the supports of each pair being movable toward and from each other for shapes of different widths.

107. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool-equipped means located at an intermediate point along said way, and a plurality of alining devices arranged along said way for alining said shape relatively to said tool equipped means.

108. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool-equipped means located at an intermediate point along said way, and a plurality of stationary supports arranged along said way for supporting said shape as it is progressed by said carriage, and a plurality of alining devices arranged along said way for alining said shape relatively to said tool equipped means.

109. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and means for disconnecting one of said bridges from said side rails and moving it to permit the supplying to and delivery from said work progressing carriage of the shape, and means for supplying a shape to said carriage transversely from the side of said way.

110. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and means for disconnecting one of said bridges from said side rails and moving it to permit the supplying to and delivery from said work progressing carriage of the shape, and means for supplying a shape by depositing it within said rails and bridges of said carriage from above.

111. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, means for disconnecting one of said bridges from said side rails and moving it to permit the supplying to and delivery from said work progressing carriage of the shape, a plurality of stationary supports arranged along said way for supporting said shape as it is progressed by said carriage, and means for supplying a shape by depositing it within said rails and bridges and upon some of said stationary supports.

112. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, means for disconnecting one of said bridges from said side rails and moving it to permit the supplying to and delivery from said work progressing carriage of the shape, and a plurality of stationary rolling supports arranged along said way for supporting said shape as it is progressed by said carriage.

113. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, driving means connected to said side rails, and settable means for stopping the carriage at a predetermined point to permit the tool equipped means to operate upon the shape.

114. A machine for operating upon structural shapes including in combination a plurality of supports arranged in a line for supporting the shape at a plurality of points along its length as it is progressed, tool equipped means arranged along said line of supports, progressing means engaging the ends of the shape for progressing it along said line of supports and relatively to said tool equipped means, means for positioning said work transversely of its travel with respect to said tool equipped means, and means for stopping the shape in predetermined position relatively to the tool equipped means to permit the tool to operate upon the shape at a predetermined point.

115. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, and means for moving the shape transversely of its length relatively to said tool-equipped means.

116. A machine for operating upon relatively long and narrow structural shapes including in combination a relatively long and narrow horizontal way, a work progressing carriage traveling to and fro along said way, said carriage comprising rigid side rails extending along said way, two bridges extending between and connected to said side rails and adapted to press against the ends of a shape carried by said work progressing carriage, tool equipped means located at an intermediate point along said way, a plurality of stationary supports arranged along said way for supporting said shape as it is progressed by said carriage, and a plurality of pairs of stationary supports arranged along said way for supporting said shape as it is progressed by said carriage, the supports of each pair being movable toward and from each other for shapes of different widths.

117. A machine for operating upon structural shapes including in combination a substantially horizontal way, tool equipped means located along said way intermediately its ends, a work progressing carriage, traveling to and fro along said way, said carriage including heads engaging the ends of a relatively long and narrow shape and including connections between said heads for holding them firmly in engagement with the ends of said shape, a plurality of rotatable supports arranged along said way beneath the shape progressed by said carriage with which said shape has rolling contact while it is progressed, alining means at either side of said shape, said alining means engaging the side edges of said shape, and means for stopping said carriage with the shape in predetermined position with said tool equipped means.

118. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway, and distance determining devices in definite relation to said head for stopping said shape in a predetermined relation to said tool equipped means to be operated upon by said tool equipped means.

119. A machine for operating upon structural shapes including in combination a substantially horizontal way, tool equipped means located along said way intermediately its ends, a work progressing carriage traveling to and fro along said way, said carriage including heads engaging the ends of a relatively long and narrow shape and including connections between said heads for holding them firmly in engagement with the ends of said shape, a plurality of rotatable supports arranged along said way beneath the shape progressed by said carriage with which said shape has rolling contact while it is progressed, alining means at either side of said shape, said alining means engaging the side edges of said shape, means for stopping said carriage with the shape in predetermined position with said tool equipped means, and means for causing said heads to disengage said shape at the end of the travel of said carriage to facilitate the delivery of said shape.

120. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway, distance determining devices in definite relation to said head for stopping said shape in a predetermined relation to said tool equipped means to be operated upon by said tool equipped means, and alining means arranged along said pathway for alining said shape relatively to said tool equipped means.

121. A machine for operating upon structural shapes including in combination a pathway along which a shape is progressed, tool equipped means located along said pathway, a head traveling relatively to said tool-equipped means and along said pathway, means for pressing the end of a shape against said traveling head, means for traveling said head along said pathway, distance determining devices in definite relation to said head for stopping said shape in a predetermined relation to said tool equipped means to be operated upon by said tool equipped means, and alining means arranged along said pathway and on either side of said tool equipped means for alining said shape relatively to said tool equipped means.

122. A machine for operating upon structural shapes including in combination a substantially horizontal way, tool equipped means located along said way intermediately its ends, a work progressing carriage traveling to and fro along said way, said carriage including heads engaging the ends of a relatively long and narrow shape and including connections between said heads for holding them firmly in engagement with the ends of said shape, a plurality of rotatable supports arranged along said way beneath the shape progressed by said carriage with which said shape has rolling contact while it is progressed, alining means at either side of said shape, said alining means engaging the side edges of said shape, means for stopping said carriage with the shape in predetermined position with said tool equipped means, means for traveling said carriage along said pathway, and connections between said traveling means and said carriage including a worm.

123. A machine for operating upon structural shapes including in combination a substantially horizontal way, tool equipped means located along said way intermediately its ends, a work progressing carriage, traveling to and fro along said way, said carriage including heads engaging the ends of a relatively long and narrow shape and including connections between said heads for holding them firmly in engagement with the ends of said shape, a plurality of rotatable supports arranged along said way beneath the shape progressed by said carriage with which said shape has rolling contact while it is progressed, alining means at either side of said shape, said alining means engaging the side edges of said shape, means for stopping said carriage with the shape in predetermined position with said tool equipped means, means for traveling said carriage along said pathway, and connections between said traveling means and said carriage including a worm, and means for disconnecting said traveling means and said carriage, said disconnecting means being located between said traveling means and said worm.

124. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway including a worm, and distance determining devices in definite relation to said head for stopping said shape in a predetermined relation to said tool equipped means to be operated upon by said tool equipped means.

125. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway including a worm, and means located on the other side of said worm from said carriage for disconnecting said traveling means and said carriage, and distance determining devices in definite relation to said head for stopping said shape in a predetermined relation to said tool equipped means to be operated upon by said tool equipped means.

126. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway, and settable distance determining devices for automatically stopping said shape in a predetermined relation to said tool equipped means to be operated upon by said tool equipped means.

127. A machine for operating upon structural shapes including in combination a pathway along which a shape is progressed, tool equipped means located along said pathway, a head traveling relatively to said tool equipped means and along said pathway, means for pressing the end of a shape against said traveling head, non-traveling devices arranged along said pathway upon which said progressed shape is supported by rolling contact, means for traveling said head along said pathway, and distance determining devices in definite relation to said head for stopping said shape in a predetermined relation to said tool equipped means to be operated upon by said tool equipped means.

128. A machine for operating upon structural shapes including in combination a pathway along which a shape is progressed, tool equipped means located along said pathway, a head traveling relatively to said tool equipped means and along said pathway, means for pressing the end of a shape against said traveling head, non-traveling devices arranged along said pathway upon which said progressed shape is supported by rolling contact, means for traveling said head along said pathway, distance determining devices in definite relation to said head for stopping said shape in a predetermined relation to said tool equipped means to be operated upon by said tool equipped means, and alining means arranged along said pathway for alining said shape relatively to said tool equipped means.

129. A machine for operating upon structural shapes including in combination a pathway along which a shape is progressed, tool equipped means located along said pathway, a head traveling relatively to said tool equipped means and along said pathway, means for pressing the end of a shape against said traveling head, non-traveling devices arranged along said pathway upon which said progressed shape is supported by rolling contact, means for traveling said head along said pathway including a worm, and distance determining devices in definite relation to said head for stopping said shape in a predetermined relation to said tool-equipped means to be operated upon by said tool-equipped means.

130. A machine for operating upon structural shapes including in combination a pathway along which a shape is progressed, tool equipped means located along said pathway, a head traveling relatively to said tool equipped means and along said pathway, means for pressing the end of a shape against said traveling head, means for traveling said head along said pathway including a worm, and means located on the other side of said worm from said carriage for disconnecting said traveling means and said carriage, and settable distance determining devices for automatically disconnecting said disconnecting means in accordance with the distance set.

131. A machine for operating upon structural shapes including in combination a pathway along which the shape is progressed, tool equipped means located along said pathway, means for progressing the shape along said pathway, means for driving said progressing means, settable distance determining devices in definite relation to an end of the progressed shape for automatically controlling said progressing means to stop the shape in a predetermined relation to said tool equipped means, and means for preventing said progressing means from progressing the shape while the shape is engaged by said tool equipped means.

132. A machine for operating upon structural shapes including in combination a pathway along which the shape is progressed, tool equipped means located along said pathway, means for progressing the shape along said pathway, means for driving said progressing means, suitable means in definite relation to an end of the progressed shape for stopping the shape in a predetermined relation to said tool equipped means, and means for preventing said progressing means from progressing the shape while the shape is engaged by said tool equipped means.

133. A machine for operating upon structural shapes including in combination a path along which the shape is progressed, tool equipped means located along said path, means for traveling said shape along said path, means for moving the work transversely of said path and settable distance determining means for automatically traveling said shape transversely of said path a distance corresponding to the setting of said distance determining means.

134. A machine for operating upon structural shapes including in combination a pathway, tool equipped means located along said pathway, means for traveling said shape in said pathway relatively to said tool equipped means, including a driving device, and settable distance determining means connected to said traveling means to cause said shape to travel relatively to said tool equipped means a distance corresponding to the setting up of said distance determining means, said distance determining means including a moving member the amount of movement of which determines the amount of travel of the shape, and a device settable to determine the amount of movement of said moving member.

135. A machine for operating upon structural shapes including in combination tool-equipped means, means for traveling a shape relatively to said tool-equipped means including a driving device, and settable distance determining means connected to said traveling means to cause said shape to travel relatively to said tool equipped means a distance corresponding to the setting of said distance determining means, said distance determining means including a moving member the amount of movement of which determines the amount of travel of the shape, and a device settable to determine the amount of movement of said moving member.

136. A machine for operating upon structural shapes including in combination a pathway, tool-equipped means located along said pathway, means for traveling said shape in said pathway relatively to said tool equipped means including a driving device, and settable distance determining means connected to said traveling means to cause said shape to travel relatively to said tool equipped means a distance corresponding to the setting of said distance determining means, said distance determining means including a rotating member, the amout of rotation of which determines the amount of travel of the shape, and a device settable to determine the amount of rotation of said rotating member.

137. A machine for operating upon structural shapes including in combination a pathway, tool equipped means located along said pathway, means for traveling said shape in said pathway relatively to said tool equipped means including a driving device, and settable distance determining means connected to said traveling means to cause said shape to travel relatively to said tool equipped means a distance corresponding to the setting of said distance determining means, said distance determining means including a rotating member, the amount of rotation of which determines the amount of travel of the shape, and means which may be set in anyone of a plurality of positions to determine the amount of rotation of said rotating member.

138. A machine for operating upon structural shapes including in combination a pathway, tool-equipped means located along said pathway, means for traveling said shape in said pathway relatively to said tool equipped means including a driving device, and settable distance determining means connected to said traveling means to cause said shape to travel relatively to said tool equipped means a distance corresponding to the setting of said distance determining means, said distance determining means including a traveling member, the amount of travel of which determines the amount of travel of the shape, and means which may be set in anyone of a plurality of positions to determine the amount of travel of said traveling member.

In testimony whereof, I have signed my name to this specification, in the presence of two subscribing witnesses.

THEODORE P. PAYNE.

Witnesses:
  JOHN D. MORGAN,
  A. L. SALTZMAN.